(12) United States Patent
Ishii et al.

(10) Patent No.: US 8,203,987 B2
(45) Date of Patent: Jun. 19, 2012

(54) MOBILE COMMUNICATIONS SYSTEM, BASE STATION APPARATUS, USER APPARATUS, AND METHOD

(75) Inventors: Hiroyuki Ishii, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 394 days.

(21) Appl. No.: 12/532,791

(22) PCT Filed: Mar. 21, 2008

(86) PCT No.: PCT/JP2008/055301
§ 371 (c)(1),
(2), (4) Date: Nov. 10, 2009

(87) PCT Pub. No.: WO2008/123148
PCT Pub. Date: Oct. 16, 2008

(65) Prior Publication Data
US 2010/0118805 A1 May 13, 2010

(30) Foreign Application Priority Data

Mar. 30, 2007 (JP) ................. 2007-094902
Apr. 16, 2007 (JP) ................. 2007-107603
Jun. 19, 2007 (JP) ................. 2007-161944
Aug. 14, 2007 (JP) ................. 2007-211595

(51) Int. Cl.
*G08C 17/00* (2006.01)
*H04H 1/00* (2006.01)
*H04B 7/204* (2006.01)
*H04Q 7/00* (2006.01)

(52) U.S. Cl. ........ 370/311; 370/312; 370/319; 370/328; 370/329; 370/344; 370/389; 370/480

(58) Field of Classification Search ................ None
See application file for complete search history.

(56) References Cited

U.S. PATENT DOCUMENTS

| 7,324,828 | B2 * | 1/2008 | Nagaoka et al. | 455/522 |
|---|---|---|---|---|
| 2006/0128412 | A1 * | 6/2006 | Mantha et al. | 455/522 |
| 2006/0286994 | A1 * | 12/2006 | Kwak et al. | 455/522 |
| 2007/0298825 | A1 * | 12/2007 | Kayama et al. | 455/522 |
| 2008/0144582 | A1 * | 6/2008 | Das et al. | 370/335 |
| 2009/0117932 | A1 * | 5/2009 | Murata | 455/522 |
| 2009/0170548 | A1 * | 7/2009 | Soliman | 455/522 |

FOREIGN PATENT DOCUMENTS

JP  3-231523 A  10/1991

(Continued)

OTHER PUBLICATIONS

Patent Abstracts of Japan, Publication No. 2001-285192, dated Oct. 12, 2001, 1 page.

(Continued)

*Primary Examiner* — Jianye Wu
*Assistant Examiner* — Christine Duong
(74) *Attorney, Agent, or Firm* — Osha • Liang LLP

(57) ABSTRACT

A user apparatus which wirelessly communicates with a base station apparatus within a mobile communications system is disclosed. The user apparatus includes a receive unit which receives control information in downlink; and a transmit unit which transmits a first channel in uplink, wherein the transmit unit, based on the control information, makes a value of a maximum transmit power of the first channel smaller than that of a nominal power specified for the mobile communications system.

19 Claims, 17 Drawing Sheets

FOREIGN PATENT DOCUMENTS

| | | |
|---|---|---|
| JP | 2001-285192 A | 10/2001 |
| JP | 2005-252388 A | 9/2005 |
| WO | 2006/051363 A1 | 5/2006 |

OTHER PUBLICATIONS

Patent Abstracts of Japan, Publication No. 03-231523, dated Oct. 15, 1991, 1 page.

Patent Abstracts of Japan, Publication No. 2005-252388, dated Sep. 15, 2005, 1 page.

3GPP TR 25.814 V7.0.0, Jun. 2006, "Physical layer aspects for evolved Universal Terrestrial Radio Access (UTRA)," 126 pages.

3GPP TSG RAN WG Meeting #47bis; Sorrento, Italy; Jan. 15-19, 2007; R1-070103, "Downlink L1/L2 Control Signaling Channel Structure: Coding," 17 pages.

3GPP TS 25.104 V6.13.0, Jun. 2006, "Base Station (BS) radio transmission and reception (FDD)," 72 pages.

3GPP TS 25.101 V6.13.0, Oct. 2006, "User Equipment (UE) radio transmission and reception (FDD)," 132 pages.

International Search Report issued in PCT/JP2008/055301, mailed on Jul. 1, 2008, with translation, 9 pages.

Written Opinion issued in PCT/JP2008/055301, mailed on Jul. 1, 2008, 3 pages.

Japanese Office Action for Application No. 2009-509078, mailed on Feb. 8, 2011 (5 pages).

TS36.101—"Combined Updates of E-UTRA UE Requirements", 3GPP TSG-RAN Meeting #46 R4-080494, Feb. 15, 2008, pp. 14-24.

* cited by examiner

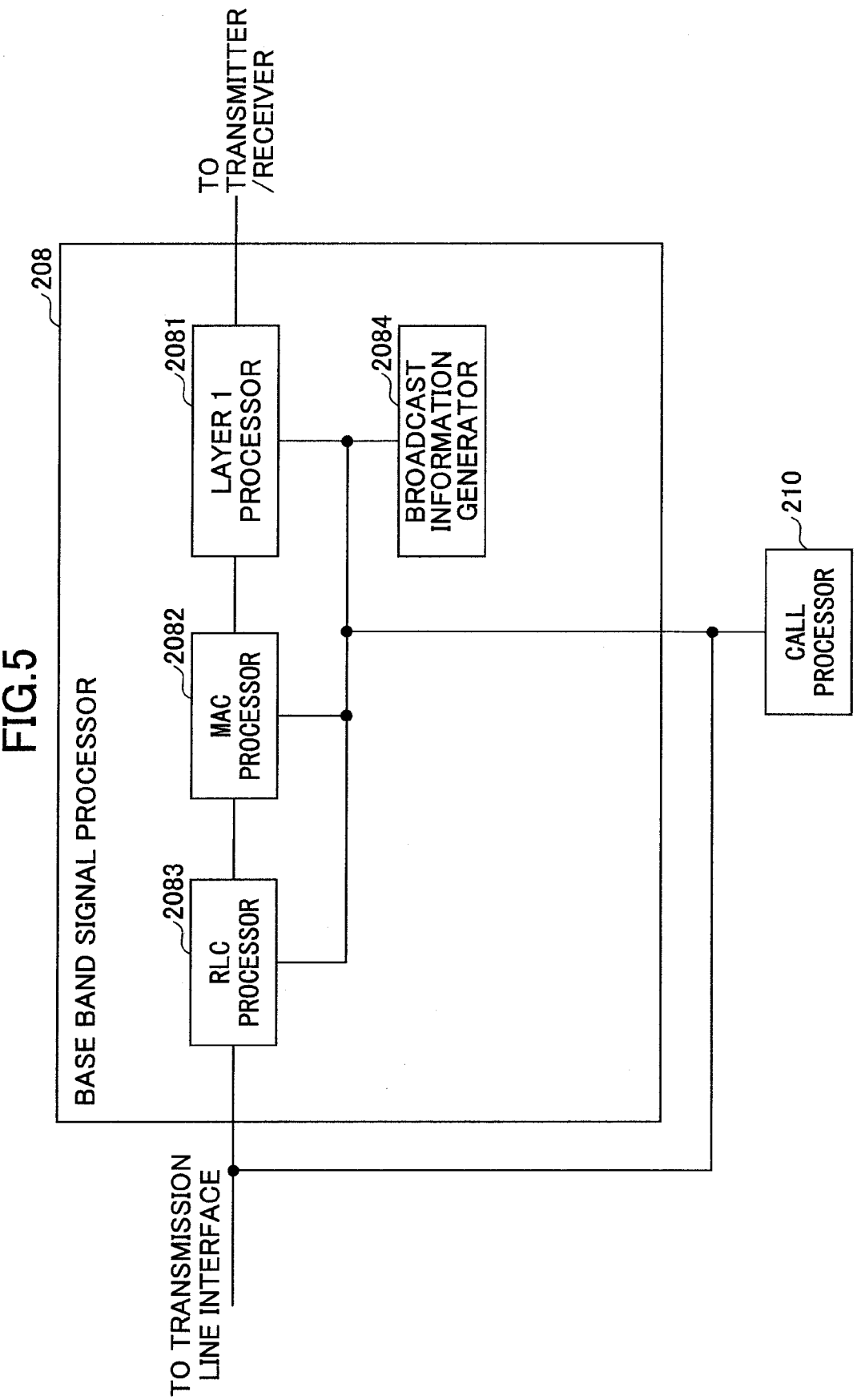

FIG.6

| AMOUNT OF FREQUENCY RESOURCE (NUMBER OF RESOURCE BLOCKS) | MODULATION SCHEME | MAXIMUM TRANSMIT POWER | TOLERANCE | AMOUNT OF REDUCTION FROM NOMINAL POWER |
|---|---|---|---|---|
| <1440kHz (<8) | QPSK | 24dBm | +1/−3dB | 0dB |
| <1440kHz (<8) | 16QAM | 24dBm | +1/−3dB | 0dB |
| 1440kHz≦ AND <2880kHz (8≦ AND <16) | QPSK | 23dBm | +2/−3dB | 1dB |
| 1440kHz≦ AND <2880kHz (8≦ AND <16) | 16QAM | 22.5dBm | +2.5/−3dB | 1.5dB |
| 2880kHz≦ AND <9MHz (16≦ AND <50) | QPSK OR 16QAM | 22dBm | +3/−3dB | 2dB |
| 9MHz≦ AND ≦18MHz (50≦ AND ≦100) | QPSK OR 16QAM | 22dBm | +3/−3dB | 2dB |

( NOMINAL POWER AT 24dBm
FREQUENCY BANDWIDTH OF
ONE RESOURCE BLOCK AT 180kHz )

TABLE A

| AMOUNT OF FREQUENCY RESOURCE (NUMBER OF RESOURCE BLOCKS) | MODULATION SCHEME | MAXIMUM TRANSMIT POWER | TOLERANCE | AMOUNT OF REDUCTION FROM NOMINAL POWER |
|---|---|---|---|---|
| <1440kHz (<8) | QPSK OR 16QAM | 24dBm | +1/−3dB | 0dB |
| 1440kHz≦ AND <2880kHz (8≦ AND <16) | QPSK OR 16QAM | 23dBm | +2/−3dB | 1dB |
| 2880kHz≦ AND <9MHz (16≦ AND <50) | QPSK OR 16QAM | 22dBm | +3/−3dB | 2dB |
| 9MHz≦ AND ≦18MHz (50≦ AND ≦100) | QPSK OR 16QAM | 22dBm | +3/−3dB | 2dB |

TABLE B

| AMOUNT OF FREQUENCY RESOURCE (NUMBER OF RESOURCE BLOCKS) | MODULATION SCHEME | MAXIMUM TRANSMIT POWER | TOLERANCE | AMOUNT OF REDUCTION FROM NOMINAL POWER |
|---|---|---|---|---|
| <1440kHz (<8) | QPSK OR 16QAM | 24dBm | +1/−3dB | 0dB |
| 1440kHz≦ AND <2880kHz (8≦ AND <16) | QPSK OR 16QAM | 22dBm | +3/−3dB | 2dB |
| 2880kHz≦ AND <9MHz (16≦ AND <50) | QPSK OR 16QAM | 20dBm | +5/−3dB | 4dB |
| 9MHz≦ AND ≦18MHz (50≦ AND ≦100) | QPSK OR 16QAM | 18dBm | +7/−3dB | 6dB |

( NOMINAL POWER AT 24dBm
FREQUENCY BANDWIDTH OF
ONE RESOURCE BLOCK AT 180kHz )

FIG.7

| AMOUNT OF FREQUENCY RESOURCE (NUMBER OF RESOURCE BLOCKS) | MODULATION SCHEME | CENTER FREQUENCY OF FREQUENCY BAND | MAXIMUM TRANSMIT POWER | TOLERANCE | AMOUNT OF REDUCTION FROM NOMINAL POWER |
|---|---|---|---|---|---|
| <1440kHz (<8) | QPSK | 1920MHz TO 1940MHz | 23dBm | +2/−3dB | 1dB |
| <1440kHz (<8) | 16QAM | 1920MHz TO 1940MHz | 23.5dBm | +1.5/−3dB | 0.5dB |
| <1440kHz (<8) | QPSK | 1940MHz TO 1960MHz | 24dBm | +1/−3dB | 0dB |
| <1440kHz (<8) | 16QAM | 1940MHz TO 1960MHz | 24dBm | +1/−3dB | 0dB |
| 1440kHz≦ AND <2880kHz (8≦ AND <16) | QPSK OR 16QAM | 1920MHz TO 1940MHz | 20dBm | +5/−3dB | 4dB |
| 1440kHz≦ AND <2880kHz (8≦ AND <16) | QPSK OR 16QAM | 1940MHz TO 1960MHz | 22dBm | +3/−3dB | 2dB |
| 9MHz≦ AND ≦18MHz (50≦ AND ≦100) | QPSK OR 16QAM | 1920MHz TO 1960MHz | 18dBm | +7/−3dB | 6dB |

( NOMINAL POWER AT 24dBm
FREQUENCY BANDWIDTH OF
ONE RESOURCE BLOCK AT 180kHz )

| Network Signaling value | Requirements (sub-clause) | E-UTRA Band | Channel bandwidth (MHz) | Resource Blocks | A-MPR (dB) |
|---|---|---|---|---|---|
| NS_01 | – | – | – | – | – |
| NS_02 | 6.6.2.4.1 | 1, 6, 9,10,11 | 10 | > [30] | ≤ 2 |
| NS_03 | 6.6.2.2.1 | 2, 4,10, 35, 36 | 3 | >[5] | |
| | 6.6.2.2.1 | 2, 4,10, 35,36 | 5 | >[5] | |
| | 6.6.2.2.1 | 2, 4,10, 35,36 | 10 | >[7] | |
| | 6.6.2.2.1 | 2, 4,10,35,36 | 15 | TBD | |
| | 6.6.2.2.1 | 2, 4,10,35, 36 | 20 | TBD | |
| NS_04 | 6.6.2.2.2 | TBD | TBD | TBD | |
| NS_05 | 6.6.3.3.1 | 1² | 10,15,20 | > [50] for QPSK | ≤ 1 |
| NS_06 | – | – | – | – | |
| ⋮ | | | | | |
| NS_32 | – | – | – | – | – |

Note: 0 ≤A-MPR ≤ 3 APPLICABLE WHEN ALLOCATED E-UTRA UPLINK FREQUENCY BANDWIDTH
Note2: ≧ (1920MHz + ALLOCATED CHANNEL BANDWIDTH)

FIG.8C   SYSTEM INFORMATION BLOCK

```
-- ASN1START
SystemInformationBlockType2 ::=      SEQUENCE {
    accessBarringInformation         SEQUENCE {
        accessBarringForTerminatingCalls BOOLEAN,
        accessProbabilityFactor      INTEGER (0),
        accessClassBarringTime       AccessClassBarringTime,
        accessClassBarringList       SEQUENCE (SIZE (6)) OF SEQUENCE {
            accessClassBarring       BOOLEAN
        }
    } OPTIONAL,
    semiStaticCommonChConfig         SemiStaticCommonChConfigSIB,
    semiStaticSharedChConfig         SemiStaticSharedChConfig,
    ue-TimersAndConstants            UE-TimersAndConstants,
    frequencyInformation             SEQUENCE {
        ul-EARFCN                    INTEGER (0..maxEARFCN)
        ul-Bandwitdh                 ENUMERATED
        additionalSpectrumEmission   INTEGER (0..31)
    },
    ...
}
AccessClassBarringTime ::=           ENUMERATED {
    min2, min3, min4, min5, min7, min10, min14, min20}
-- ASN1STOP
```

FIG.8D

| | |
|---|---|
| accessBarringInformation | INFORMATION ON ACCESS RESTRICTION<br>"accessBarringForTerminatingCalls", WHICH IS INFORMATION SHOWING WHETHER ACCESS RESTRICTION IS APPLIED;<br>"accessProbabilityFactor", WHICH SHOWS PROPORTION AND PROBABILITY WHEN ACCESS RESTRICTION IS APPLIED;<br>"accessClassBarringTime", WHICH SHOWS RESTRICTION TIME WHEN ACCESS RESTRICTION IS APPLIED; AND<br>"accessClassBarringList", WHICH SHOWS CLASS FOR APPLYING ACCESS RESTRICTION |
| semiStaticCommonChConfig | INFORMATION ON CONFIGURATION OF SEMI-STATIC COMMON CHANNEL |
| semiStaticSharedChConfig | INFORMATION ON CONFIGURATION OF SEMI-STATIC SHARED CHANNEL |
| ue-TimersAndConstants | INFORMATION ON TIMER AND CONSTANT USED IN MOBILE STATION |
| frequencyInformation | INFORMATION ON FREQUENCY,<br>INCLUDING ul-EARFCN, WHICH SHOWS FREQUENCY; ul-Bandwidth, WHICH SHOWS SYSTEM BANDWIDTH; AND<br>additionalSpectrumEmission, WHICH SHOWS INFORMATION ON ADDITIONALLY APPLIED SPURIOUS EMISSION |

FIG.8E

MOBILITY CONTROL INFORMATION

```
-- ASN1START

MobilityControlInformation ::=    SEQUENCE {
    targetCellIdentity            PhysicalCellIdentity,
    eutra-CarrierFreq             EUTRA-CarrierFreq              OPTIONAL,
    eutra-CarrierBandwidth        EUTRA-CarrierBandwitdh         OPTIONAL,
    additionalSpectrumEmission    INTEGER (0..31)                OPTIONAL,
    semiStaticCommonChConfig      SemiStaticCommonChConfig       OPTIONAL,
    dedicatedRandomAccessParams   DedicatedRandomAccessParams    OPTIONAL
}

EUTRA-CarrierBandwitdh ::=        SEQUENCE {
    dl-Bandwidth                  ENUMERATED
    ul-Bandwidth                  ENUMERATED
}

-- ASN1STOP
```

FIG.8F

| MobilityControlInformation | INFORMATION ON MOBILITY CONTROL, INCLUDING "targetCellIdentity", WHICH IS TARGET CELL IDENTIFIER; "eutra-CarrierBandwidth", WHICH IS INFORMATION ON SYSTEM BANDWIDTH; additionalSpectrumEmission, WHICH SHOWS INFORMATION ON ADDITIONALLY APPLIED SPURIOUS EMISSION; INFORMATION ON CONFIGURATION OF SEMI-STATIC COMMON CHANNEL; AND PARAMETER ON DEDICATED RANDOM ACCESS |
|---|---|
| EUTRA-CarrierBandwidth | INFORMATION ON SYSTEM BANDWIDTH, INCLUDING DOWNLINK BANDWIDTH AND UPLINK BANDWIDTH |

FIG.12

| INFORMATION ELEMENT | SETTING RANGE | UNIT | SETTING EXAMPLE |
|---|---|---|---|
| MAXIMUM ALLOWED TRANSMIT POWER (NUMBER OF RESOURCE BLOCKS $\leq$ 25) | INTEGER (-50 TO 33) | dBm | 24 dBm |
| MAXIMUM ALLOWED TRANSMIT POWER (25< NUMBER OF RESOURCE BLOCKS $\leq$ 50) | INTEGER (-50 TO 33) | dBm | 21 dBm |
| MAXIMUM ALLOWED TRANSMIT POWER (50< NUMBER OF RESOURCE BLOCKS $\leq$ 75) | INTEGER (-50 TO 33) | dBm | 18 dBm |
| MAXIMUM ALLOWED TRANSMIT POWER (75< NUMBER OF RESOURCE BLOCKS $\leq$ 100) | INTEGER (-50 TO 33) | dBm | 14 dBm |

MOBILE COMMUNICATIONS SYSTEM, BASE STATION APPARATUS, USER APPARATUS, AND METHOD

BACKGROUND OF THE INVENTION

1. Field of the Invention

The present invention relates generally to the technical field of mobile communications, and specifically to a mobile communications system, a base station apparatus, a user apparatus, and a method using next generation mobile communications technology.

2. Description of the Related Art

Communications schemes to succeed such schemes as wideband code division multiple access (W-CDMA), high-speed downlink packet access (HSDPA), and high-speed uplink packet access (HSUPA) (i.e., LTE: Long Term Evolution) are being investigated in a W-CDMA standardization body, 3GPP. As radio access schemes in the LTE, OFDM (orthogonal frequency division multiplexing) for downlink and SC-FDMA (Single-Carrier Frequency Division Multiple Access) for uplink are viewed as promising (See Non-patent document 1, for example.)

The OFDM scheme is a multi-carrier transmission scheme for dividing a frequency band into multiple narrow frequency bands (sub-carriers) and putting data on the respective sub-carriers to transmit the data. It is expected that densely lining up the sub-carriers on the frequency axis while having them in an orthogonal relationship would make it possible to achieve high-speed transmission and improve the utilization efficiency of the frequency.

The SC-FDMA scheme is a single-carrier transmission scheme for dividing a frequency bandwidth per terminal, and transmitting using different frequency bands among multiple terminals. This scheme is preferable from the points of view of wider coverage and reduced power consumption of the terminal, as interference between the terminals may be reduced in a simple and effective manner and variation in transmit power may be reduced.

In LTE systems, one or more resource blocks are allocated to a mobile station to conduct communications in both downlink and uplink. The resource blocks are shared among a large number of mobile stations within the system. A base station apparatus determines which one of the multiple mobile stations a resource block is to be allocated to per sub-frame (1 ms in LTE) (This process is called scheduling). In downlink, the base station apparatus transmits, to the mobile station selected in the scheduling, a shared channel in one or more resource blocks. In uplink, the selected mobile station transmits a shared channel, to the base station apparatus, in one or more resource blocks.

Then, in a communications system using the above-mentioned shared channel, it is necessary to signal which user apparatus the above-mentioned shared channel is allocated to per sub-frame (1 ms in LTE. Also may be called TTI (time transmission interval)). In LTE, a control channel used for the signaling is called a physical downlink control channel (PDCCH) or a downlink (DL) L1/L2 control channel. Information on the physical downlink control channel includes Downlink Scheduling Information, ACK/NACK (Acknowledgement/Negative acknowledgement information), Uplink Scheduling Grant, Overload Indicator, and Transmission Power Control Command Bit, for example. (See Non-patent document 2, for example.) The ACK/NACK (Acknowledgement/Negative acknowledgement information) may be called Physical Hybrid ARQ Indicator Channel (PHICH). The PHICH may be defined as a different physical channel having a parallel relationship with respect to the PDCCH, not being included in the PDCCH.

The downlink scheduling information and uplink scheduling grant correspond to information for signaling which user apparatus the shared channel is allocated to. The downlink scheduling information may include, with respect to the downlink shared channel, downlink resource block allocation information, UE ID, the number of streams, information on precoding vector, data size, modulation scheme, information on HARQ (hybrid automatic repeat request), etc. The downlink scheduling information may be called downlink assignment information or a downlink scheduling grant. Moreover, uplink scheduling information includes, with respect to the uplink shared channel, uplink resource allocation information, UE ID, data size, modulation scheme, uplink transmit power information, information on demodulation reference signal in uplink MIMO, etc. The uplink scheduling information and uplink scheduling grant may collectively be called downlink control information (DCI).

Now, mobile telephone, wave astronomy, satellite communications, aviation and sea radar, earth resources survey, and wireless LAN that use radio waves generally divide frequency bands to be utilized to prevent interference by each other, Moreover, within frequency bands allocated to mobile telephone systems, multiple systems exist with a frequency band for each system being separated, for example.

For example, FIG. 1 shows how a frequency band between 1884.5 MHz and 1980 MHz is utilized. In FIG. 1, 1920 to 1980 MHz is allocated to IMT-2000 (International Mobile Telecommunication-2000) UL (Uplink), within which W-CDMA (UTRA FDD) system is operational from 1940 to 1980 MHz. Moreover, PHS systems are operational at a band of frequency which is smaller than 1920 MHz, or more specifically at a band of frequency from 1884.5 to 1919.6 MHz.

The above-described 1920 to 1980 MHz corresponds to UTRA FDD Band I Uplink in 3GPP.

In other words, in systems utilizing radio waves, frequency bands to be utilized are separated to prevent intersystem interference. However, a transmitter which radiates radio waves ends up radiating unwanted emissions (below called adjacent channel interference) in a band outside an own-system frequency band. Thus, multiple neighboring systems end up interfering with each other even if frequency bands are separated. Thus, there is going to be a large detrimental effect on a neighboring system if the power level of the unwanted emissions is large.

In order to prevent the detrimental effect on the neighboring system due to such adjacent channel interference, characteristics of the adjacent-channel interference and spurious emission are specified in each system. For example, in a 3GPP W-CDMA system, TS25.104 6.6 Output RF spectrum emissions (see Non-patent document 3) exists as a requirement for base station adjacent channel interference and spurious emission, while TS25.101 6.6 Output RF spectrum emissions (see Non-patent document 4) exists as a requirement for mobile station adjacent channel interference and spurious emission.

Below the requirements for mobile station adjacent channel interference and spurious emission will further be described in detail.

For example, a requirement for adjacent channel leakage power ratio (ACLR) in the above-described Non-patent document 4 specifies that an amount of interference with another system which exists infrequency bands 5 MHz and 10 MHz away from a system in question is suppressed to no more than a predetermined threshold, and is specified in a relative value.

For example, for a specified value of ACLR for the frequency band 5 MHz away (separation) of 33 dB and a transmit power of 21 dBm, an amount of interference that is leaking from the system in question into the frequency band 5 MHz away must be suppressed to no more than −12 dBm.

Moreover, a requirement for spurious emission to the PHS band in the above-described Non-patent document 4 specifies suppressing to no more than −41 dBm per 300 kHz, which specifying is in an absolute value.

In general, a region for which the requirement for ACLR is applied is set to be a region in which system bandwidth of the system in question is multiplied by 2.5, while a region for which the requirement for spurious emission is applied is set to be the other region. FIG. 2 illustrates the region for which the requirement for ACLR is applied and the region for which the requirement for spurious emission is applied. The value of 2.5 is set based on the fact that a spectrum of a unwanted emissions to outside the system bandwidth is proportional to the transmit bandwidth.

Now, in order to suppress the unwanted emissions to outside the above-mentioned system bandwidth, a mobile station needs to be provided with a highly linear power amplifier. Thus, taking into account the cost or size of the mobile station, reducing the above-mentioned unwanted emissions or meeting the above-described requirements for ACLR and for spurious emission may be difficult. Then, in the above-mentioned Non-patent document 4, it is specified to reduce the maximum transmit power in order to suppress the cost or size of the mobile station. For example, in a Release 5 specification, it is specified to reduce the maximum transmit power based on the amplitude ratio of uplink DPDCH and DPCCH. Moreover, in the Release 6 specification, it is specified for the mobile station to calculate a value of a Cubic metric, and reduce the maximum transmit power based on the Cubic metric value. Reducing the maximum transmit power makes it possible to further suppress the cost or size of the mobile station.

Non-patent document 1: 3GPP TR 25.814 (V7.0.0), "Physical Layer Aspects for Evolved UTRA," June 2006
Non-patent document 2: R1-070103, Downlink L1/L2 Control Signaling Channel Structure: Coding
Non-patent document 3: 3GPP TS25.104 v6.13.0
Non-patent document 4: 3GPP TS25.101 v6.13.0

SUMMARY OF THE INVENTION

Problem(s) to be Solved by the Invention

However, the related art as described above has the following problem.

For example, as illustrated in FIG. 1, in Japan a gap between the frequency band allocated to PHS systems and that allocated to IMT-2000 is very small (i.e., 0.4 MHz). Thus, operating W-CDMA or LTE between 1920 MHz and 1940 MHz means that high interference power would leak into the frequency band allocated to the PHS systems. More specifically, for LTE, the transmit bandwidth is very wide (i.e., up to 20 MHz), which effect is quite large.

Here, very strict requirements for ACLR and for spurious emission in order to protect the PHS systems lead to limitations in the performance of the power amplifier of the mobile station. Thus, as stated in the Background Art section, it is possible to reduce the maximum transmit power of the mobile station. However, another problem of reduced cell coverage arises when the maximum transmit power of the mobile station is reduced.

On the other hand, with the PHS systems existing only in a specific region (e.g., Japan only), uniformly implementing a specification for reducing the maximum transmit power of the mobile station as described above leads to a problem of reduced cell coverage in all geographical regions of the world, which is very inefficient. In the above-described example, while the PHS systems in Japan are taken into account, various systems using the radio waves exist in different parts of the world, leading to similar problems.

Thus, in order to solve the problem as described above, an amount of interference to an adjacent system must be flexibly reduced based on the geographic region and various situations. For example, in LTE, the transmit power of the uplink shared channel is reported in an uplink scheduling grant mapped to a physical downlink control channel as described above. Thus, the uplink scheduling grant may control the transmit power of the mobile station, and flexibly reduce the amount of interference to the adjacent system. However, when the uplink scheduling grant is erroneous, it becomes difficult for the base station apparatus to control the transmit power of the mobile station. Thus, it is not possible to achieve the object of reliably securing the frequency band allocated to the PHS.

In light of problems as described above, the problem to be solved by the invention of the subject application is to provide a mobile communications system, a base station apparatus, a user apparatus, and a method that flexibly reduce an amount of interference to an adjacent system based on the geographical region in which the mobile communications system is applied and various situations.

Means for Solving the Problem

In the present invention, a user apparatus which wirelessly communicates with a base station apparatus in a mobile communications system is used. The user apparatus includes a receive unit which receives control information in downlink and a transmit unit which transmits a first channel in uplink. Based on the control information, the transmit unit makes a value of maximum transmit power of the first channel no greater than nominal power specified in the mobile communications system.

Advantage of the Invention

The present invention makes it possible to appropriately reduce an amount of interference with an adjacent system according to geographical areas in which the mobile communications system is applied and to other situations, and makes it possible to provide services using highly efficient mobile communications.

BRIEF DESCRIPTION OF THE DRAWINGS

FIG. 5 is a partial block diagram illustrating a base band signal processor of the base station apparatus according to an embodiment of the present invention;

FIG. 6 is a diagram showing a table which defines the maximum transmit power based on an amount of frequency resource and modulation scheme;

FIG. 7 is a diagram showing tables (when there are multiple ones) that define the maximum transmit power based on an amount of frequency resource and modulation scheme;

FIG. 8A is a diagram showing a table which defines the maximum transmit power based on an amount of frequency resource, modulation scheme and center frequency;

FIG. 8B is a diagram showing an example of the interrelationship among the maximum transmit power, frequency, and amount of resource, etc.

FIG. 8C is a diagram showing an example of system control information;

FIG. 8D is a diagram describing major parameters;

FIG. 8E is a diagram showing an example of mobility control information;

FIG. 8F is a diagram describing major parameters;

FIG. 12 is diagram illustrating an example of maximum allowed transmit power defined per bandwidth.

DESCRIPTION OF THE PREFERRED EMBODIMENTS

Description of Notations

50 cell; 1001, 1002, 1003, 100n mobile station; 102 transmit and receive antenna; 104 amplifier; 106 transmitter and receiver; 108 base band processor; 110 application unit; 1081 layer 1 processor; 1082 MAC processor; 1083 maximum transmit power controller; 200 base station apparatus; 202 transmit and receive antenna; 204 amplifier; 206 transmitter and receiver; 208 base band signal processor; 210 call processor; 212 transmission line interface; 2081 layer 1 processor; 2082 MAC processor; 2083 RLC processor; 2084 broadcast information generator; 300 access gateway apparatus; and 400 core network

Best Mode of Carrying Out the Invention

A description is given below with regard to embodiments of the present invention with reference to the drawings. Throughout the drawings for explaining the embodiments, same letters are used for those having the same functions, so that repetitive explanations are omitted.

Embodiment 1

Figure 1:
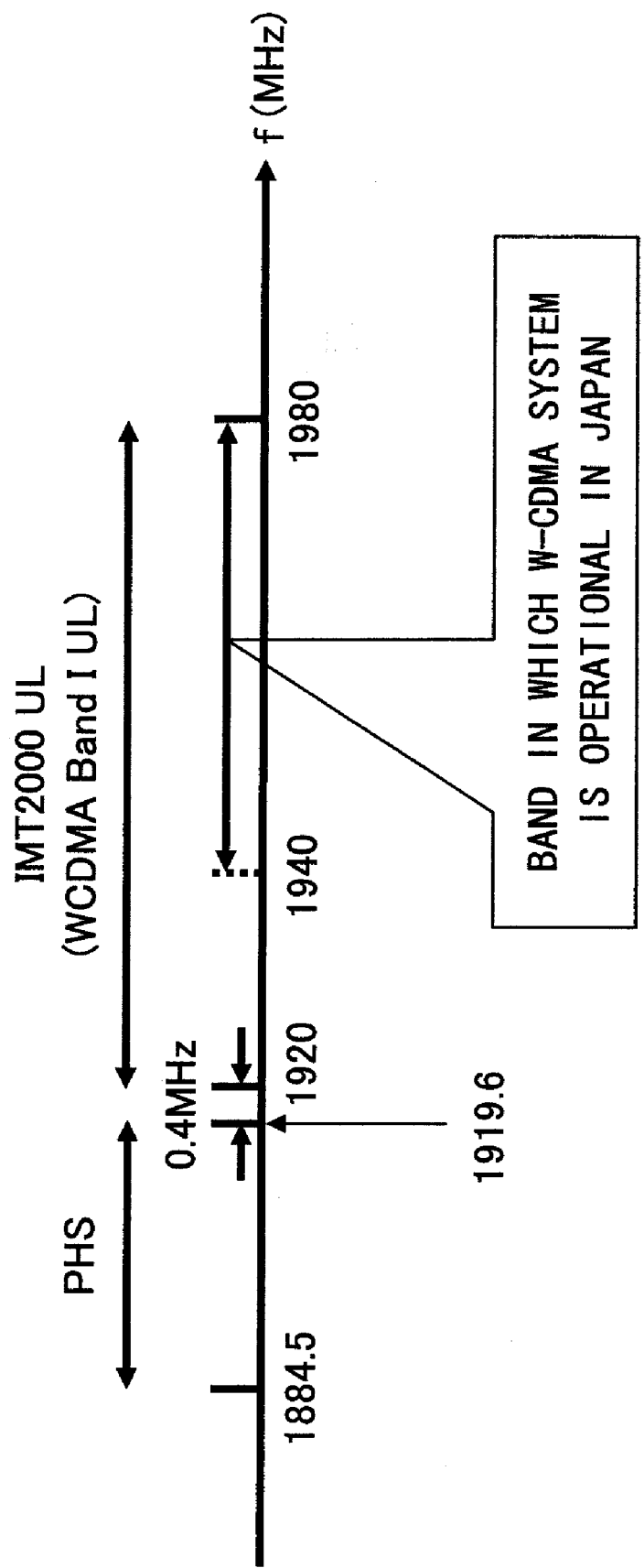
FIG. 1 is a diagram showing how frequencies between 1884.5 MHz and 1980 MHz are utilized in Japan.
Figure 2:
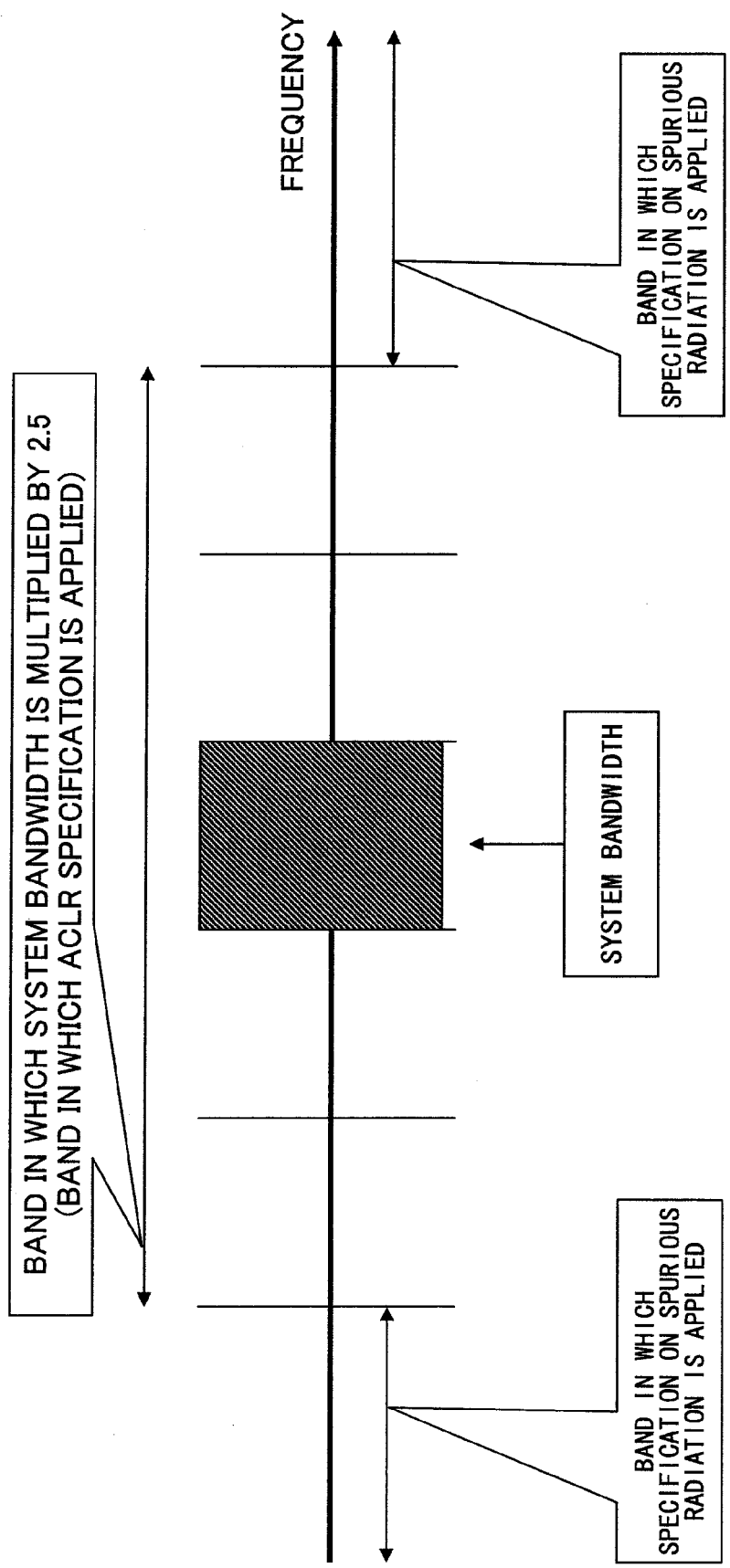
FIG. 2 is a diagram showing a region for which a requirement for ACLR is applied and a region for which a requirement for spurious emission is applied.
Figure 3:
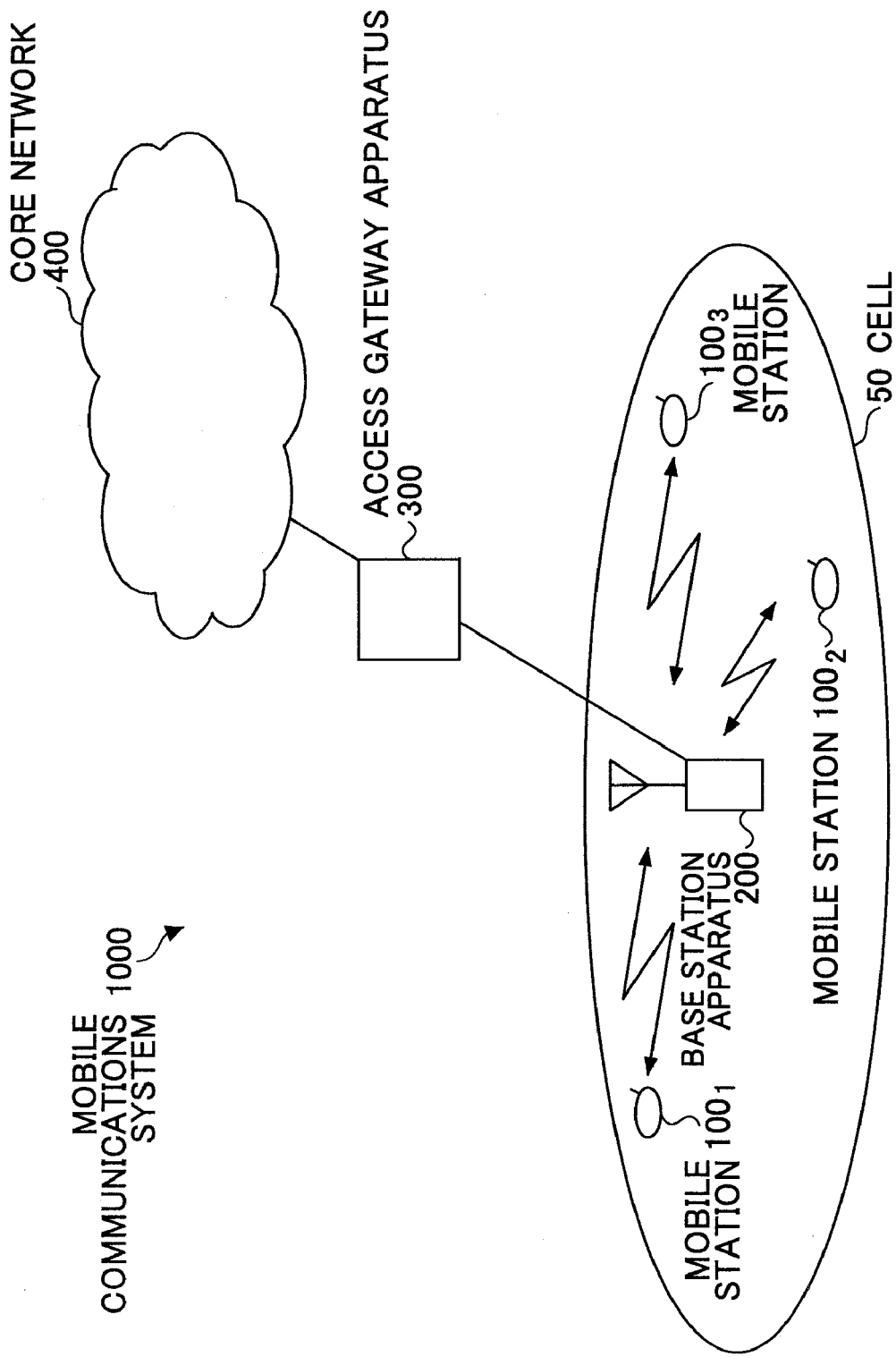
FIG. 3 is a block diagram illustrating a configuration of a mobile communications system according to an embodiment of the present invention.

With reference to FIG. 3, a mobile communications system having mobile station and base station apparatuses according to the embodiment of the present invention is described.

A mobile communications system 1000, which is a system to which Evolved UTRA and UTRAN (also known as Long Term Evolution or Super 3G) is applied, for example, includes a base station apparatus (eNB: eNode B) 200; and multiple mobile stations 100n (1001, 1002, 1003, . . . 100n, where n is an integer greater than 0) which communicate with the base station apparatus 200. The base station apparatus 200 is connected to an upper station (for example, an access gateway apparatus 300), the access gateway apparatus 300 being connected to a core network 400. The mobile station 100n communicates in a cell 50 with the base station apparatus 200 by means of Evolved UTRA and UTRAN.

Each mobile station (1001, 1002, 1003, . . . , 100n) has the same configuration, function, and status, so that it will be referred to as the mobile station 100n unless otherwise specified. For convenience of explanation, it is a mobile station that communicates wirelessly with the base station apparatus, but more generally it may be a user apparatus (UE: user equipment), which includes a mobile terminal as well as a fixed terminal.

As a radio access scheme, the mobile communications system 1000 uses OFDM (orthogonal frequency division multiplexing) for downlink and SC-FDMA (single-carrier frequency division multiple access) for uplink. As described above, the OFDM scheme is a multi-carrier transmission scheme for dividing a frequency band into multiple narrow frequency bands (sub-carriers) and mapping data onto the respective sub-carriers to conduct communications. The SC-FDMA scheme is a single-carrier transmission scheme for dividing a frequency bandwidth per terminal, and using different frequency bands among multiple terminals to reduce interference between the terminals.

Here, communications channels in Evolved UTRA and UTRAN are described.

For downlink, a physical downlink control channel (downlink L1/L2 control channel) and a physical downlink shared channel (PDSCH) shared by the respective mobile stations 100n are used. User data, or, in other words, a normal data signal is transmitted in the physical downlink shared channel. Moreover, an ID of a user which communicates using the physical downlink shared channel, information on transport format of the user data (i.e., Downlink Scheduling Information), an ID of a user which communicates using the physical uplink shared channel, information on transport format of the user data (i.e., Uplink Scheduling Grant), acknowledgment information of the physical uplink shared channel, etc., are reported using the physical downlink control channel. The Downlink Scheduling Information may also be called Downlink Assignment Information or Downlink Scheduling Grant.

Moreover, in downlink, a Common Control Physical Channel (CCPCH) is transmitted. The CCPCH may also be called a Physical Broadcast Channel (P-BCH). In the CCPCH, a Broadcast Channel is transmitted. The Broadcast Channel transmitted in the CCPCH is called a static broadcast channel. Besides the static broadcast channel, a dynamic broadcast channel (a Dynamic part of the broadcast channel) also exists. The dynamic broadcast channel is mapped to the PDSCH. In this case, Downlink Scheduling Information for the dynamic broadcast channel is transmitted in the downlink physical control channel. Then, broadcast information is mapped to the broadcast channel. In this case, CCPCH and PDSCH correspond to a physical channel, BCH corresponds to a transport channel, and broadcast information corresponds to a logical channel. Alternatively, with respect to the static broadcast channel, broadcast information (BCCH: Broadcast Control Channel) as a logical channel may be mapped to BCH as a transport channel, and the BCH may be mapped to P-BCH as a physical channel. Moreover, with respect to the dynamic broadcast channel, broadcast information (BCCH) as a logical channel may be mapped to DL-SCH as a transport channel, and the DL-SCH may be mapped to PDSCH as a physical channel.

For uplink, a physical uplink shared channel (PUSCH) for use on a shared basis among the respective mobile stations 100n and uplink control channel are used. User data, or, in other words, a normal data signal is transmitted in the physical uplink shared channel.

Moreover, CQI (Channel Quality Indicator), which is used for AMCS (Adaptive Modulation and Coding Scheme) and the scheduling process for the physical downlink shared channel, and Acknowledgement Information for the physical downlink shared channel are transmitted in the uplink control channel. The content of the Acknowledgement Information is expressed as either one of Acknowledgement (ACK), which indicates that the transmit signal has been received properly, and Negative Acknowledgement (NACK), which indicates that it has not been received properly.

Figure 4:
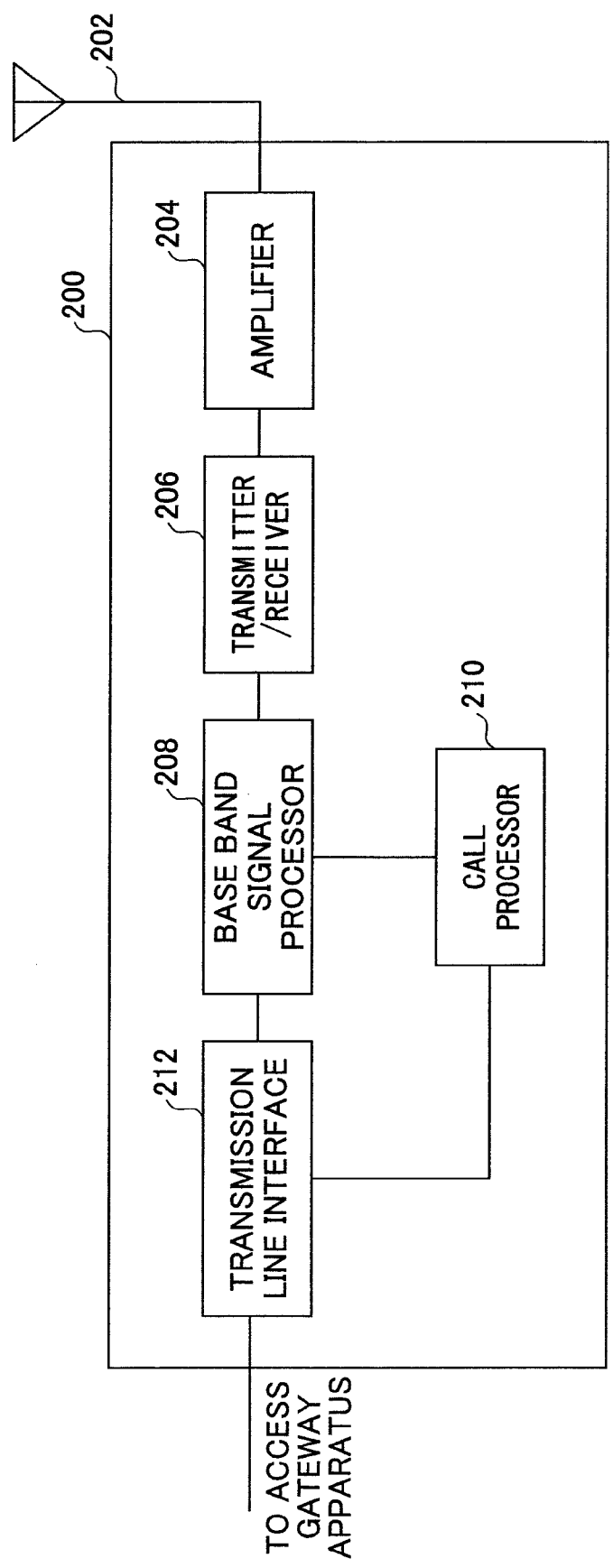
FIG. 4 is a partial block diagram illustrating a base station apparatus according to an embodiment of the present invention.

A base station apparatus 200 according to an embodiment of the present invention is described with reference to FIG. 4.

The base station apparatus 200 according to the embodiment of the present invention includes a transmit and receive antenna 202, an amplifier 204, a transmitter and receiver 206, a base band signal processor 208, a call processor 210, and a transmission line interface 212.

The user data transmitted from the base station apparatus 200 to the mobile station 100n in downlink is input from an upper station (e.g., an access gateway apparatus 300) which is located at a layer higher than the base station apparatus 200 via a transmission line interface 212 to a base band signal processor 208.

In the base band signal processor 208, a transmit process of PDCP layer, segmentation and concatenation of user data, a transmit process of RLC (radio link control) layer such as RLC retransmission control, MAC (Medium Access Control) retransmission control, e.g., transmit process of HARQ (Hybrid Automatic Repeat reQuest), scheduling, transmit format selection, channel encoding, and Inverse Fast Fourier Transform process are performed, so that the processed data are transferred to the transmitter and receiver 206. Moreover, transmit processes such as Inverse Fast Fourier Transform and channel encoding are performed on a signal of a physical downlink control channel which is a downlink control channel, so that the processed data are transferred to the transmitter and receiver 206.

Moreover, as described below, the base band signal processor 208 generates information on maximum transmit power of the mobile station 100n, and makes the above-mentioned information as a part of broadcast information. Furthermore, transmit processes such as Inverse Fast Fourier Transform and channel encoding are performed on the broadcast information, so that the processed data are transferred to the transmitter and receiver 206.

In the transmitter and receiver 206, a frequency conversion process is applied for converting a base band signal output from the base band signal processor 208 to a radio frequency band, which converted signal is amplified at the amplifier 204, so that the amplified signal is transmitted from the transmit and receive antenna 202.

On the other hand, for data to be transmitted from the mobile station 100n to the base station apparatus 200 in uplink, a radio frequency signal received at the transmit and receive antenna 202 is amplified at the amplifier 204, which amplified signal is frequency converted to a base band signal at the transmitter and receiver 206, and the base band signal is input into the base band signal processor 208.

In the base band signal processor 208, an FFT process, IDFT process, error correction decoding, receive process on MAC retransmission control, RLC layer receive process, and PDCP layer receive process are performed on user data included in the base band signal input, and the processed data are transferred to the access gateway apparatus 300 via the transmission line interface 212.

The call processor 210 performs call processes such as setting and releasing of a communications channel, management of the status of the radio base station 200, and radio resource management.

A configuration of the base band signal processor 208 is described with reference to FIG. 5.

The base band signal processor 208 includes a layer 1 processor 2081, a MAC processor 2082, an RLC processor 2083, and a broadcast information generator 2084.

The layer 1 processor 2081, the MAC processor 2082, the call processor 210, and the broadcast information generator 2084 in the base band signal processor 208 are mutually connected.

In the layer 1 processor 2081, channel encoding and IFFT processes on data transmitted in downlink, channel decoding, IDFT, and FFT processes on data transmitted in uplink, etc., are performed. Here, data to be transmitted in downlink and data to be transmitted in uplink include a control signal for processing radio resource control (RRC), and, an IP packet using Web browsing, File Transfer Protocol (FTP), and voice packets (VoIP), for example. Moreover, for a logical channel, the user data are called DTCH or DCCH, for example.

The layer processor 2081 receives, from the MAC processor 2082, an ID of a user which communicates using the physical downlink shared channel, information on transport format of the user data (i.e., Downlink Scheduling Information), an ID of a user which communicates using the physical uplink shared channel, and information on transport format of the user data (i.e., Uplink Scheduling Grant). Moreover, the layer processor 2081 performs transmit processes such as channel encoding and an IFFT process on an ID of a user which communicates using the physical downlink shared channel, information on transport format of the user data (i.e., Downlink Scheduling Information), an ID of a user which communicates using the physical uplink shared channel, and information on transport format of the user data (i.e., Uplink Scheduling Grant). The ID of the user which communicates using the physical downlink shared channel, information on transport format of the user data (i.e., Downlink Scheduling Information), the ID of the user which communicates using the physical uplink shared channel, and information on transport format of the user data (i.e., Uplink Scheduling Grant) are mapped to the physical downlink control channel as a downlink control channel.

Moreover, the layer 1 processor 2081 receives broadcast information from the broadcast information generator 2084, and performs the transmit process such as channel encoding and the IFFT process on the broadcast information. The broadcast information may be input to the layer 1 processor 2081 from the broadcast information generator 2084 directly, or to the layer 1 processor 2081 from the broadcast information generator 2084 via the RLC processor 2083 and the MAC processor 2082. In either case, MAC, RLC, and PDCP layer processes (e.g., concatenation, segmentation, and adding of header) are performed, followed by inputting into the layer 1 processor 2081.

The MAC processor 2082 performs MAC retransmission control of downlink user data, e.g., a HARQ transmit process, scheduling process, transmit format selecting process, frequency resource allocating process, etc. Here, the scheduling process refers to the process of selecting a mobile station to receive user data using a shared channel in the sub-frame in downlink. Moreover, the transmit format selecting process refers to the process of determining modulation scheme, encoding rate, and data size for user data to be received by a mobile station selected in the scheduling. The determining of the modulation scheme, encoding rate, and data size is performed based on whether the CQI reported in uplink from the mobile station is good. Moreover, the frequency resource allocating process refers to a process in which a resource block used for user data to be received by a mobile station selected in scheduling is determined. The determining of the resource block is performed based on the CQI reported in uplink from the mobile station, for example. Then, the MAC processor 2082 reports, to the layer 1 processor 2081, an ID of a user which communicates using a physical downlink shared channel, and information on transport format of the user data that are determined in the above-described scheduling process, transmit format selecting process, and frequency resource allocating process. Moreover, the MAC processor 2082 also provides the actual user data to the layer 1 processor 2018.

Furthermore, the MAC processor 2082 performs a receive process on MAC retransmission control of uplink user data, scheduling process, transmit format selecting process, frequency resource allocating process, etc. Here, the scheduling process refers to the process of selecting a mobile station which transmits user data using a shared channel in the sub-frame. Moreover, the transmit format selecting process refers to the process of determining modulation scheme, encoding rate, and data size for user data to be transmitted by a mobile station selected in the scheduling. The determining of the modulation scheme, encoding rate, and data size are performed based on UE power headroom reported from the UE (mobile station), and SIR or path loss of a reference signal for sounding that is transmitted in uplink from the mobile station, for example. Moreover, the frequency resource allocating process refers to a process in which a resource block used for user data to be transmitted by a mobile station selected in scheduling is determined. The resource block determining process is performed based on an SIR of a reference signal for sounding that is transmitted in uplink from the mobile station, for example. Then, the MAC processor 2082 reports, to the layer 1 processor 2081, an ID of a user which communicates using a physical uplink shared channel, and information on transport format of the user data that are determined in the above-described scheduling process, transmit format selecting process, and frequency resource allocating process. Moreover, the MAC processor 2082 receives results of decoding uplink user data and performs the MAC layer receive process. Furthermore, the processed uplink user data are provided to the RLC processor 2083.

The RLC processor 2083 performs segmentation and concatenation of downlink packet data; a transmit process of RLC layer such as the transmit process of RLC retransmission control; and performs the receive process of segmentation and concatenation, and RLC retransmission control on uplink data. Moreover, in the RLC processor 2083, the PDCP layer process may further be performed.

The broadcast information generator 2084 generates broadcast information within the cell 50. The broadcast information refers to information on system bandwidth, information on transmit power of downlink reference signal, information on a sub-frame in which MBMS data are transmitted, information on an amount of interference in uplink, and information on a physical random access channel, for example.

Moreover, the broadcast information generator 2084 may generate information on the maximum transmit power of a mobile station in the cell in question. Alternatively, the broadcast information generator 2084 may generate information that the maximum transmit power of a mobile station is set to be smaller than the nominal power in the cell in question as broadcast information. For example, information may be generated such that, for the nominal power of a mobile station, or in other words, for the maximum transmit power in the specification of 24 dBm, the power may be set 1 dB smaller in the cell 50 in question. Alternatively, information may be generated such that, for the maximum transmit power in the specification of 24 dBm, the maximum transmit power of the mobile station may be set to 23 dBm in the cell in question. Here, setting the power to be 1 dB smaller may mean that the power is always set to be smaller by 1 dB, or that the power can be set by 1 dB. In other words, in the latter, a mobile station with an expensive power amplifier may transmit uplink with the maximum transmit power of 24 dBm, while a mobile station with an inexpensive power amplifier may transmit uplink with the maximum transmit power of 23 dBm. Here, the uplink transmission refers to transmission of the uplink shared channel and physical uplink shared channel (PUSCH), and transmission of uplink control channel and an uplink reference signal. Nominal power, or the maximum transmit power on the specification, may be called Nominal Maximum Output Power. In the above-described example, values of 24 dBm and 23 dBm are merely examples, so that other values may be used. For example, the maximum transmit power of the mobile station in the specification may be 23 dBm or 22 dBm.

Information on the maximum transmit power of the mobile station in the cell in question, or information that the maximum transmit power of the mobile station in the cell in question is to be set smaller may be based on an amount of frequency resources used in transmitting the uplink shared channel or control channel, or the reference signal, or, more particularly, the number of resource blocks, or the size of the resource unit. Alternatively, information on the maximum transmit power in the cell in question, or information that the maximum transmit power is set to be small in the cell in question may be based on modulation scheme used in transmitting the uplink shared channel or control channel. Alternatively, information on the maximum transmit power in the cell in question, or information that the maximum transmit power in the cell in question is to be set smaller may be based on an amount of frequency resources used in transmitting the uplink shared channel or control channel, or, more particularly, the number of resource blocks, or the size of the resource unit, and modulation scheme used in transmitting the uplink shared channel or control channel. For example, as shown in FIG. 6, a table showing correspondence among the amount of frequency resources used in transmitting uplink shared channel or control channel, modulation scheme, and maximum transmit power, or an amount of reduction from nominal power may be generated as information for reducing the maximum transmit power in the cell in question. In this case, the broadcast information generator 2084 generates the above table based on information on the geographical area in which the cell is located, for example, country and area, and various situations such as information on a system adjacent in frequency. The base station apparatus 200 transmits the table as apart of broadcast information. The tolerance shown indicates an error from a specified value that is allowed due to environmental conditions such as the temperature difference. Moreover, the maximum transmit power shown illustrates the value of the maximum transmit power used when the transmit power is actually set in the mobile station.

The table shown in FIG. 6 is merely exemplary so that values other than those in FIG. 6 may be set for the amount of frequency resource, modulation scheme, maximum transmit power, tolerance, and the amount of reduction from nominal power. In either case, the maximum transmit power is set based on the amount of frequency resources and modulation scheme.

More specifically, in the table in FIG. 6, the amount of frequency resource and modulation scheme are predefined at both the base station apparatus 200 and mobile station 100n, so that the portion related to the maximum transmit power or the amount of reduction from the nominal power may be transmitted as a part of broadcast information. In this case, the broadcast information generator 2084 generates the above table based on information on the geographical areas in which the cell is located, for example, country and area, and various situations such as information on a system adjacent in frequency, and the base station apparatus 200 transmits values in the above table as a part of the broadcast information.

Alternatively, the table shown in FIG. 6 may be defined in multiple at the base station apparatus 200 and the mobile station 100n, so that only identifying information (an information bit for identification) identifying the multiple number of tables may be transmitted. In this case, the broadcast information generator 2084 select an appropriate table from the above multiple number of tables based on information on the geographical areas in which the cell is located, for example, country and area, and various situations such as information on a system adjacent in frequency, and the base station apparatus 200 transmits identifying information identifying the above tables as a part of the broadcast information. FIG. 7 shows a case of defining two tables showing correspondence among the amount of frequency resource used in transmitting uplink shared channels or control channels, modulation scheme, and maximum transmit power, or amount of reduction from the nominal power. Comparing Tables A and B, the maximum transmit power is set smaller in Table B. Or the amount of reduction from the nominal power is set larger in Table B. In this case, the broadcast information generator 2084 selects either the Table A or Table B based on information on the geographical area in which the cell is located, for example, country and area, and various situations such as information on a system adjacent in frequency, and the base station apparatus 200 transmits the identifying information on the above Tables as a part of the broadcast information. For example, when a cell 50 is located in a geographical area in which a system adjacent in frequency must be more strictly protected, the broadcast information generator 2084 may select the Table B, and the base station apparatus 200 may transmit identifying information of Table B as a part of broadcast information.

In the above-described example, while a case is shown of the broadcast information generator 2084 selecting either one of the Tables A and B, the broadcast information generator 2084 may perform the process of selecting both the Tables A and B, or may perform the process of selecting neither the Table A nor B. In this case, instead of identifying information in the Tables, having defined bits indicating applying/not applying for each of the Tables A and B, the base station apparatus 200 may send the defined bits as a part of broadcast information.

Moreover, when both the Tables A and B are selected, the amount of reduction from the nominal power may be set to be the larger one of the amount of reduction in the Table A and the amount of reduction in the Table B. Alternatively, it may be set to be the smaller one of the amount of reduction in the Table A and the amount of reduction in the Table B. Alternatively, it may be set to be the average value of the amount of reduction in the Table A and the amount of reduction in the Table B. Alternatively, it may be set to be the sum of the amount of reduction in the Table A and the amount of reduction in the Table B.

In the above-described example, while a case is described such that there are two tables of the Tables A and B, the number of tables may be one or three.

In the above-described example, while the amount of reduction from the nominal power or the maximum transmit power is associated with the amount of frequency resources or the modulation scheme, the amount of reduction from the nominal power or the maximum transmit power may further be associated with the system bandwidth in the system in question.

The table shown in FIG. 7 is merely exemplary so that values other than those in FIG. 7 may be set for the amount of frequency resources, modulation scheme, maximum transmit power, tolerance, and the amount of reduction from nominal power. In either case, the maximum transmit power is set based on the amount of frequency resources and modulation scheme.

Alternatively, information on the maximum transmit power in the cell in question, or information that the maximum transmit power in the cell in question is to be set smaller may be based on an amount of frequency resources used in transmitting the uplink shared channel or control channel, or reference signal; or, more particularly, the number of resource blocks or the size of the resource unit, modulation scheme used in transmitting the uplink shared channel or control channel, or reference signal, and a position (e.g., center frequency) of the frequency band used in transmitting the uplink shared channel or control channel, or reference signal. For example, a table such as illustrated in FIG. 8A, showing correspondence between the amount of frequency resources, modulation scheme, center frequency of the frequency band, and maximum transmit power, or the amount of reduction from the nominal power may be generated as information that the maximum transmit power is set to be smaller in the cell in question. In this case, the broadcast information generator 2084 generates the above table based on information on the geographical area in which the cell is located, for example, country and area, and various situations such as information on a system adjacent in frequency, and the base station apparatus 200 transmits the above table as a part of broadcasting information. In FIG. 8A, setting the maximum transmit power when the central frequency of the frequency band used in transmitting the uplink shared channel or control channel or the reference signal is situated between 1920 MHz and 1940 MHz to be smaller than the maximum transmit power when it is situated between 1940 MHz and 1960 MHz makes it possible to reduce the amount of interference to the frequency band allocated to the PHS systems. What has been described as the center frequency of the frequency band used in transmitting the uplink shared channel or control channel, or reference signal does not have to be the center frequency, and may be a frequency at the edge of the frequency band as along as it is a value indicating the position of the frequency band used in the uplink transmission. Alternatively, what has been described as the center frequency of the frequency band used in transmitting the uplink shared channel or control channel, or reference signal may be the frequency band in which the uplink transmission is conducted. Here, frequency bands (I, II, III, IV, . . . ) in 3GPP are those defined in Non-patent document 4 (TS 25.101, 5.2), for example. Alternatively, what has been described as the center frequency of the frequency band used in transmitting the uplink shared channel or control channel, or reference signal may be reported as a value such as 2 GHz band, 1.5 GHz band, or 800 MHz band.

In this case, as shown in FIG. 7, the table illustrated in FIG. 8A may also be defined in multiple at the base station apparatus 200 and the mobile station 100n, so that only information identifying the multiple number of tables may be transmitted. In this case, the broadcast information generator 2084 select an appropriate table from the above multiple number of tables based on information on the geographical area in which the cell is located, for example, country and area, and various situations such as information on a system adjacent in frequency, and the base station apparatus 200 transmits information identifying the above tables as a part of the broadcast information.

As described above, the base station 200 may transmit, as a part of broadcast information, a bit indicating application/non-application of the respective tables in lieu of identifying information in the table.

For example, a table shown in FIG. 8B is used in lieu of a table shown in FIG. 8A. In FIG. 8B, the one line specified with a network signaling value corresponds to Table A or Table B in FIG. 8A or FIG. 7. In other words, network signaling value (NS_01. NS_02, . . . ) at the left-most column in FIG. 8B corresponds to identifying information identifying the multiple tables as described above.

Moreover, requirement (sub-clause) (6.6.2.4.1, 6.6.2.2.1, . . . ) at the second left column in FIG. 8B corresponds to below-described information on whether a predetermined spurious specification should be met, or information on whether an ACLR specification should be met, or information on whether a spectrum emission mask (SEM) specification should be met. More specifically, "6.6.3.3.1" for NS_05 in FIG. 8B may correspond to information on whether the predetermined spurious specification should be met, "6.6.2.4.1" for NS_02 in FIG. 8B may correspond to information on whether the predetermined ACLR specification should be met, and "6.6.2.2.1" for NS_03 in FIG. 8B may correspond to information on whether the predetermined SEM specification should be met. In other words, the predetermined spurious specification to be met may be defined in sub-clause "6.6.3.3.1" for NS_05 in FIG. 8B, the predetermined ACLR specification to be met may be defined in sub-clause "6.6.2.4.1" for NS_02 in FIG. 8B, and the predetermined SEM specification to be met may be defined in sub-clause "6.6.2.2.1" for NS_03 in FIG. 8B. The "6.6.3.3.1", "6.6.2.4.1", and "6.6.2.2.1" may be chapter or sub-clause numbers in TS36.101, which is a specification for radio characteristics for an LTE mobile station.

Moreover, E-UTRA band (1, 6, 9, 10, 11) in the third left column in FIG. 8B corresponds to the position in the frequency band used in transmitting as described above. In other words, E-UTRA band (1, 6, 9, 10, 11) in the third left column in FIG. 8B corresponds to the center frequency in the frequency band in FIG. 8A.

Furthermore, channel bandwidth (10, 3, 5, . . . ) in the fourth left column in FIG. 8B corresponds to the frequency bandwidth in the frequency band in FIG. 8A.

Moreover, the fifth left element of "Resource Blocks" (>[30], >[5]) in FIG. 8B corresponds to the above-described amount of frequency resources. In other words, the fifth left element of "Resource Blocks" (>[30], >[5]) in FIG. 8B corresponds to the amount of frequency resources (the number of resource blocks) in the left-most column in FIG. 8A.

Moreover, the sixth left A-MPR in FIG. 8B corresponds to the above-described amount of reduction from the nominal power. In other words, the sixth left A-MPR in FIG. 8B corresponds to the amount of reduction from the nominal power in the right-most column in FIG. 8A. The A-MPR in FIG. 8B, which may be called Additional Maximum Power Reduction, is an amount by which the maximum transmit power may be reduced rather than an amount by which the maximum transmit power must be reduced.

The above-described Additional Maximum Power Reduction may be a maximum transmit power reduction amount applied to a general maximum transmit power reduction amount, or may be a maximum transmit power reduction amount which may be applied in lieu of the general maximum transmit power reduction amount. The former yields (eventual maximum transmit power reduction amount)= (general maximum transmit power reduction amount)+(additional maximum transmit power reduction amount), while the latter yields (eventual maximum transmit power reduction amount)= MAX((general maximum transmit power reduction amount),(additional maximum transmit power reduction amount)).

The general maximum transmit power reduction amount may be a maximum transmit power reduction amount which may be applied regardless of a network signaling value, for example.

Alternatively, information on the maximum transmit power in the cell in question, or information that the maximum transmit power is to be set smaller in the cell in question, may be set as information associated with a calculation equation for a Cubic metric. For example, with Cubic metric (CM) as $$CM=a+[20*\log 10((v\_norm\ 3)rms)-20*\log 10((v\_norm\_ref\ 3)rms)]/k,$$

v_norm as normalized voltage waveform of a signal,
v_norm_ref as a reference for the normalized voltage waveform of the signal, and
the amount of reduction from the nominal power=CM+b, the value of a, k, or b may be set as information on the maximum transmit power in the cell in question or as information that the maximum transmit power is set to be smaller in the cell in question. In this case, the broadcast information generator 2084 determines the value a, k, or b based on information on the geographical areas in which the cell is located, for example, country and area, and various situations such as information on a system adjacent in frequency, and the base station apparatus 200 transmits the value a, k, or b as a part of the broadcast information. The Cubic metric equation is merely exemplary so that other equations are also applicable. Moreover, what is described as Cubic metric may be another metric as long as the latter is a metric from which power leaking into the adjacent channel may be estimated.

The above-described values of a, k, and b may be set according to the position (e.g., center frequency) of the frequency band used in transmitting the uplink shared channel or control channel, or reference signal. For example, two sets of a, k, and b values, or in other words, the above-described values of a, k, and b for the center frequency of 1920 to 1930 MHz and the above-described values of a, k, and b for the center frequency of 1930 to 1940 MHz may be set as broadcast information.

Alternatively, the broadcast information generator 2084 may generate, as a part of broadcast information, information indicating the geographical area in which the cell 50 is located, and information on an operator which provides communications using a mobile communications system in the cell 50 (e.g., information identifying the operator). Here, as information indicating the geographical area, there is country code, for example. Moreover, as information on the operator, there is PLMN (Public Land Mobile Network) identifier (PLMN-identity).

Alternatively, the broadcast information generator 2084 may generate, as a part of broadcast information, information on whether the mobile station 100n should meet the predetermined spurious emission requirements. For example, the broadcast information generator 2084 may generate, as a part of broadcast information, information that a requirement for spurious emission in the PHS band should be met. Here, the base station apparatus 200 transmits, as broadcast information, information that the above-described requirement for spurious emission in the PHS band should be met. In this case, the information that the above-described requirement for spurious emission in the PHS band should be met may mean that the above-described requirement for spurious emission in the PHS band should be met even where the ACLR requirement is applied and the requirement for spurious emission is not applied, for example.

Alternatively, the broadcast information generator 2084 may generate, as a part of broadcast information, information on whether the mobile station 100n should meet the predetermined ACLR requirements. For example, the broadcast information generator 2084 may generate, as a part of broadcast information, information that a specified value of 43 dB as an ACLR2 requirement for W-CDMA systems should be met. In this case, the base station apparatus 200 transmits, as broadcast information, information that the value of 43 dB as the ACLR2 requirement should be met. Moreover, the broadcast information generator 2084 may generate, as a part of broadcast information, information on whether the mobile station 100n should meet the predetermined ACLR requirement. For example, the broadcast information generator 2084 may generate, as a part of broadcast information, information that 38 dB as the ACLR2 requirement for W-CDMA systems should be met. In this case, the base station apparatus 200 transmits, as broadcast information, information that 38 dB as the ACLR2 requirement should be met. Here, ACLR2 is what specifies the interference power to the second adjacent channel out of the requirements for ACLR, and the ACLR2 requirement for the W-CDMA systems is a requirement which restricts an amount of interference to a system which is located in a frequency band 10 MHz away from the system in question.

In the example as described above, while the broadcast information generator 2084 generates, as a part of broadcast information, information on whether the mobile station 100n should meet the predetermined spurious emission requirement, or information on whether the ACLR requirement should be met, it may instead generate, as a part of broadcast information, information on whether the predetermined spectrum emission mark (SEM) requirement should be met, and report the broadcast information to the mobile station.

The broadcast information generator 2084 may generate the above-described information on the maximum transmit power of the mobile station as a system information block for cell selection or cell re-selection, for example. Now, condition or requirement for spurious emission may exist in multiple (for example, spurious emission requirement, ACLR requirement, SEM requirement, etc.). Such condition or requirement may be used additionally as long as they don't contradict each other. The presence/absence of application of these requirements additionally used may be distinguished by a certain parameter (for example, an integer value within the range of 0-31), the value of which parameter to be reported as broadcast information. The parameter may be referred to as "additionalSpectrumEmission" to mean an additional requirement on transmitted or emitted power. For example, as information on the maximum transmit power of the mobile station as described above, information on whether the predetermined spurious emission requirement should be met, or information on whether the ACLR requirement should be met, or information on whether the predetermined Spectrum Emission Mark requirement (SEM specification) should be met may be reported as a system information block as shown in FIGS. 8C and 8D (or mobility control information as shown in FIGS. 8E and 8F). "additionalSpectrumEmission" may take any value between 0 and 31, based on which value the information on whether the predetermined spurious emission requirement should be met, or the information on whether the ACLR requirement should be met, or information on whether the predetermined Spectrum Emission Mark requirement (SEM specification) should be met is reported to the user apparatus.

The following describes the contents of the system information block in FIGS. 8C and 8D. "accessBarringInformation" is information on access restriction, "accessBarringForTerminatingCall", which is information indicating whether access restriction is applied; "accessProbabilityFactor", which is the proportion or probability when the access restriction is applied; "accessClassBarringTime", which indicates the barring time when the access restriction is applied and "accessClassBarringList", which indicates a class for applying the access restriction. The access restriction refers to a control in which access to a base station is restricted at the time of congestion, for example. semiStaticCommonChConfig is information on configuration of a semi-static common channel. "semiStaticSharedChConfig" is information on configuration of a semi-static shared channel. "ue-TimersAndConstant" is information on timer and constant used in the mobile station. "frequencyInformation", which is information on frequency, includes: ul-EARFCN, which indicates a frequency number; ul-Bandwidth, which indicates the system bandwidth; and additionalSpectrumEmission, which is information on spurious emission applied additionally. Details of additionalSpectrumEmission are as described above.

The broadcast information generator 2084 reports the above-described broadcast information to a layer 1 processor 2081. In other words, broadcast information generated at the broadcast information generator 2084 is reported to a mobile station positioned in the cell 50 via the layer 1 processor 2081, the transmitter and receiver 206, the amplifier 204, and the antenna 202.

Figure 9:
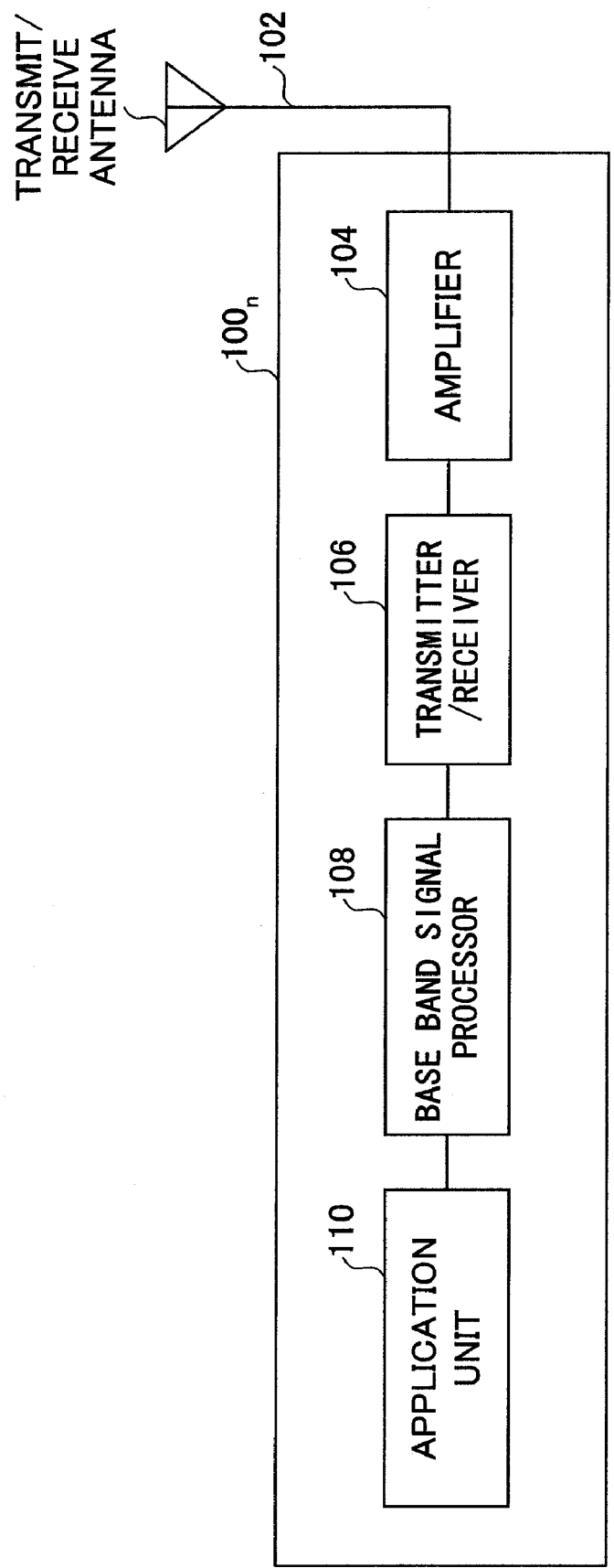
FIG. 9 is a partial block diagram illustrating a mobile station according to an embodiment of the present invention.

A mobile station apparatus 100n according to an embodiment of the present invention is described with reference to FIG. 9.

As shown, the mobile station 100n has a transmit/receive antenna 102, an amplifier 104, a transmitter/receiver 106, a base band signal processor 108, and an application unit 110.

With respect to downlink data, a radio frequency signal received at the transmit/receive antenna 102 is amplified at the amplifier 104 and frequency converted at the transmitter/receiver 106 to convert the result to a base band signal. At the base band signal processor 108, receive processes, such as an FFT process, error correction decoding and retransmission control, are performed on this base band signal. Within the downlink data, the downlink user data are transferred to the application unit 110. The application unit 110 performs the process on a layer higher than physical and MAC layers. Moreover, of the downlink data, broadcast information is also transferred to the application unit 110.

Moreover, when information on the maximum transmit power of the mobile station in the cell in question or information that the maximum transmit power of the mobile station is set to be smaller in the cell in question is received as a part of broadcast information, the information is transferred to a below-described maximum transmit power controller 1083. Alternatively, even when information indicating the geographical area in which the cell 50 is located, or information on an operator which provides communications using a mobile communications system in the cell 50 (e.g., information identifying the operator) is received as a part of broadcast information, the information is transferred to the below-described maximum transmit power controller 1083. Moreover, in the mobile station 100n, when information on whether the predetermined spurious emission requirement should be met, information on whether predetermined ACLR requirement should be met, or information on whether the predetermined SEM requirement should be met is received as a part of broadcast information, the above information is transferred to the below-described maximum transmit power controller 1083.

On the other hand, uplink user data are input to the base band signal processor 108 from the application unit 110. In the base band signal processor 108, a transmit process for retransmission control (H-ARQ, hybrid ARQ), channel encoding, DFT process, IFFT process, etc., are performed for transferring to the transmitter and receiver 106. In the transmitter and receiver 106, a frequency conversion process is applied for converting a base band signal output from the base band signal processor 108 to a radio frequency band, which converted signal is then amplified at the amplifier 104, after which the amplified signal is transmitted from the transmit and receive antenna 102.

Figure 10:
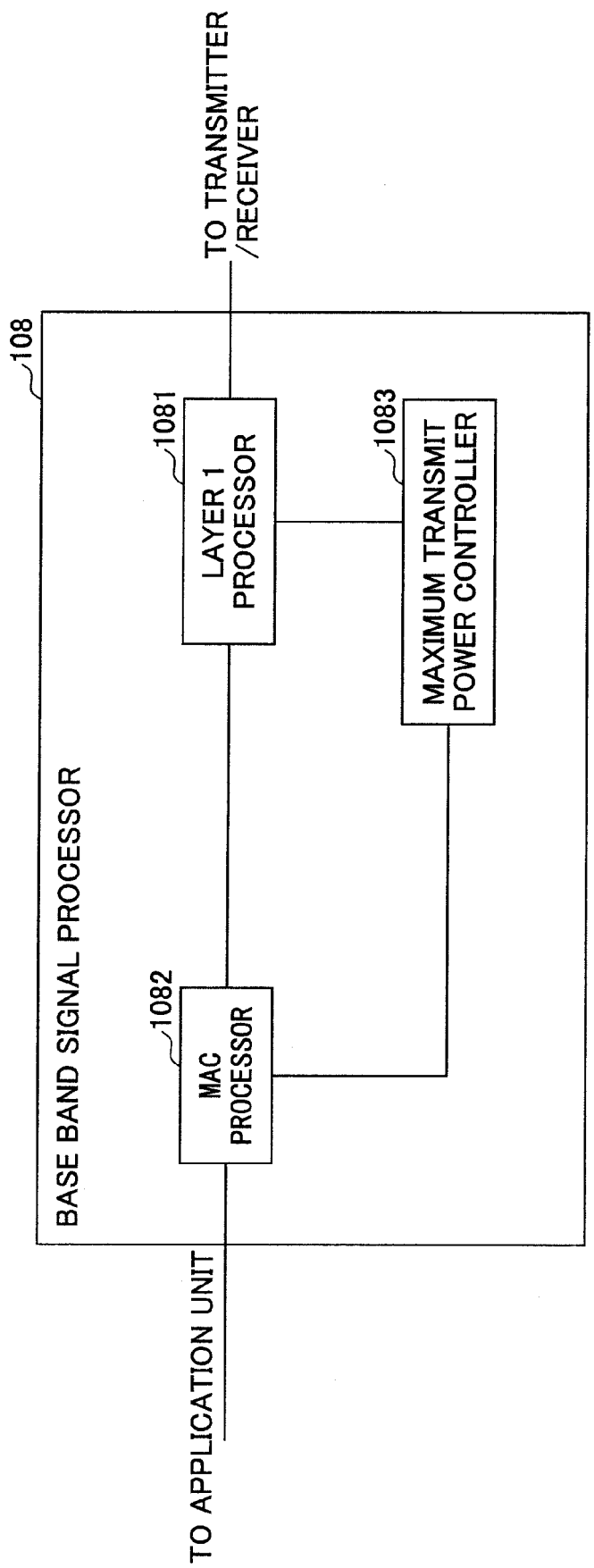
FIG. 10 is a block diagram illustrating a base band signal processor of the mobile station apparatus according to an embodiment of the present invention.

A configuration of the base band signal processor 108 is described with reference to FIG. 10.

The base band signal processor 108 includes a layer 1 processor 1081, a MAC (Medium Access Control) processor 1082, and a maximum transmit power controller 1083. The layer 1 processor 1081, the MAC (Medium Access Control) processor 1082, and the maximum transmit power controller 1083 are connected with one another.

In the layer 1 processor 1081, channel decoding and an FFT process, etc. are performed on a signal received in downlink.

The layer 1 processor 1081 demodulates and decodes a broadcast channel included in the signal received in downlink, the result of which decoding is transmitted to the MAC processor 1082 and the maximum transmit power controller 1083. For example, the layer 1 processor 1081 transmits, to the maximum transmit power controller 1083, information on the maximum transmit power of the mobile station in the cell in question, information that the maximum transmit power of the mobile station is set to be lower in the cell in question, or information indicating the geographical area in which the cell 50 is located; information on an operator providing communications using a mobile communications system in the cell 50, e.g., operator identifying information, information on whether the predetermined spurious emission requirement should be met or information on whether the predetermined ACLR requirement should be met, or information on whether the predetermined SEM requirement should be met that is included in broadcast information which is a result of decoding of the broadcast channel.

For example, the layer 1 processor 1081 may receive a system information block shown in FIGS. 8C and 8D (or mobility control information shown in FIGS. 8E and 8F) as the broadcast channel, and "additionalSpectrumEmission" within System Information Block as information on the maximum transmit power of the mobile station in the cell in question. In this case, the "additionalSpectrumEmission" is transmitted to the maximum transmit power controller 1083.

Here, the "additionalSpectrumEmission" corresponds to the information on whether the predetermined spurious emission requirement should be met, information on whether the ACLR requirement should be met, or information on whether the predetermined Spectrum Emission Mask (SEM) requirement should be met. Now, when it is reported in the broadcast information that the predetermined spurious emission requirement should be met, the predetermined ACLR requirement should be met, or the predetermined Spectrum Emission Mark requirement (SEM requirement) should be met, the reported requirement means the requirement which should be met additionally as well as normal spurious emission requirement, ACLR requirement and SEM requirement.

The layer 1 processor 1081 receives information on the maximum transmit power from the maximum transmit power controller 1083. Then, the transmit power of the uplink shared channel and control channel is controlled using information on the maximum transmit power. Transmit power control in the layer 1 processor 1081 is described further in detail.

When transmitting user data in uplink in the sub-frame in question, the layer 1 processor 1081 receives user data from the MAC processor 1082. The layer 1 processor 1081 performs an encoding and data modulation process, DFT process, sub-carrier mapping process, IFFT process, etc., on the user data, the results of which processes are transmitted to the transmitter and receiver as a base band signal. Here, the transmit power of the uplink shared channel may be determined using information on the transmit power of the uplink shared channel that is provided from the MAC processor 1082. More specifically, an offset to a reference signal for sounding may be specified as information on the transmit power, and the transmit power of the uplink shared channel may be determined based on the offset and the transmit power of the reference signal for sounding. Alternatively, as information on the transmit power, a path loss between the base station apparatus 200 and the mobile station 100n, an offset to the reference signal for sounding, a command for transmit power control, transmit bandwidth, etc., may be provided from the MAC processor 1082, and the transmit power of the uplink shared channel may be determined based on the above information on transmit power. More specifically, the transmit power of the uplink shared channel may be determined based on the equation below and information on the transmit power:

$$P_{PUSCH}(i)=\min\{P_{MAX}, 10\log_{10}(M_{PUSCH}(i))+P_{O\_PUSCH}(j)+\alpha PL+\Delta_{MCS}(MCS(i))+f(i)\}[dBm],$$

where $P_{PUSCH}(i)$ is the transmit power of PUSCH in Sub-frame #i, $P_{MAX}$ is the maximum transmit power/nominal power for the UE, $M_{PUSCH}$ is the number of RBs, $P_{O\_PUSCH}$ is a parameter specified by NW, $\alpha$ is a parameter specified by NW, PL is a path loss, $\Delta_{MCS}$ is an offset value which is set per MCS, f(i) is an offset value for adjusting with f(i)=f(i−1)+Δ, Δ is a command for transmit power control, and the above-described $P_{MAX}$, $M_{PUSCH}$, $P_{O\_PUSCH}$, $\alpha$, PL, $\Delta_{MCS}$, and f(i) correspond to information on the transmit power.

Here, the layer 1 processor 1081 controls the above transmit power based on information received from the maximum transmit power controller 1083. More specifically, the transmit power of the uplink shared channel is set such that it becomes no more than the maximum transmit power set using information on the maximum transmit power. When the transmit power of the determined uplink shared channel is greater than the maximum transmit power set using information on the maximum transmit power, the transmit power of the uplink shared channel is set to the same value as the maximum transmit power set using the above-described information on the maximum transmit power. Alternatively, the $P_{MAX}$ value in the above-recited equation may be set to the maximum transmit power which is set using information on the maximum transmit power. Then, as a result, the transmit power of the uplink shared channel becomes no more than the maximum transmit power which is set using information on the maximum transmit power. As described below, the maximum transmit power reported from the maximum transmit power controller 1083 may be based on, for example, an amount of frequency resource of the uplink shared channel, or more specifically on the number of resource blocks, the size of resource units, modulation scheme, and the position in the frequency band used in transmitting the uplink shared channel.

Moreover, when a control channel is transmitted in uplink in the sub-frame in question, the layer 1 processor 1081 performs an encoding and data modulation process, DFT process, sub-carrier mapping process, IFFT process, etc., on the control signal, e.g., CQI and acknowledgement information, and transmits them as a base band signal to the transmitter and receiver. Here, also for the uplink control channel, an offset to a reference signal for sounding may be set, and the transmit power of the uplink control channel may be determined based on the offset and the transmit power of the reference signal for sounding. Here, the offset may be reported by the base station apparatus 200 in an RRC message, for example. Or more specifically, the transmit power of the uplink control channel may be determined based on the equation below and information on the transmit power:

$$P_{PUSCH}(i)=\min\{P_{MAX}, P_{O\_PUSCH}+PL+\Delta_{MCS\_PUCCH}(MCS)+g(i)\}[dBm]$$

Here, $P_{PUSCH}(i)$ is a transmit power of PUSCH in Sub-frame #i,
$P_{MAX}$ is the maximum transmit power for the UE,
$P_{O\_PUCCH}$ is a parameter specified by NW,
PL is a path loss,
$\Delta_{MCS\_PUCCH}$ is an offset value which is set per MCS,
g(i) is an offset value for adjusting with g(i)=g(i−1)+Δ, and
Δ is a command for transmit power control.
Then, when the transmit power of the determined uplink control channel is greater than the maximum transmit power set using information on the maximum transmit power, the transmit power of the uplink control channel is set to be the same value as the maximum transmit power set using the above-described information on the maximum transmit power. Alternatively, the $P_{MAX}$ value in the above-recited equation may be set to the maximum transmit power which is set using the above-described information on the maximum transmit power. Then, as a result, the transmit power of the uplink control channel becomes no more than the maximum transmit power which is set using the above-described information on the maximum transmit power.

Moreover, even for transmitting a reference signal for uplink sounding, if the transmit power of the reference signal for uplink sounding is greater than the maximum transmit power set using the above-described information on the maximum transmit power, the transmit power of the reference signal for uplink sounding is set to be the same value as the maximum transmit power set using the above-described information on the maximum transmit power.

For example, the transmit power of the reference signal for uplink sounding may be calculated as per below:

$$P_{SRS}(i)=\min\{P_{MAX}, P_{SRS\_OFFSET}+10\log_{10}(M_{SRS})+P_{O\_PUSCH}+\alpha PL+\Delta_{MCS}(MCS_{REF})+f(i)\}[dBm],$$

where $P_{SRS}(i)$ is the transmit power of the reference signal for sounding in the Sub-frame #1,
$P_{MAX}$ is the maximum transmit power/nominal power for the UE,
$M_{SRS}$ is the number of RBs,
$P_{O\_PUSCH}$ is a parameter specified by NW,
α is a parameter specified by NW,
PL is a path loss,
$\Delta_{MCS}$ is an offset value which is set per MCS,
$MCS_{REF}$ is MCS for reference,
f(i) is an offset value for adjusting with f(i)=f(i−1)+Δ, and
Δ is a command for transmit power control,
where the $P_{MAX}$ value in the above-recited equation may be set as the maximum transmit power which is set using information on the maximum transmit power. Then, as a result, the transmit power of the reference signal for sounding becomes no more than the maximum transmit power which is set using information on the maximum transmit power.

In other words, the transmit power of the uplink shared channel, control channel, and reference signal for sounding is set such that the maximum transmit power reported from the maximum transmit power controller 1083 becomes the upper limit.

Moreover, the layer 1 processor 1081 demodulates/decodes the physical downlink control channel, a downlink control channel that is included in the downlink receive signal, the result of which decoding is transmitted to the MAC processor 1082.

Moreover, the layer 1 processor 1081 measures the receive signal quality of the downlink reference signal (DL-RS: Downlink Reference Signal). The receive signal quality, which may be expressed as, for example, a ratio of desired signal power versus non-desired signal power, may be expressed as SIR (Signal-to-Interference Ratio). For example, the numerical range expressing the SIR may be segmented into a predetermined number of ranges, so that CQI may be derived according to which segment the SIR measured value belongs to. The CQI is provided in alignment with a predetermined reporting period, and transmitted in a sub-frame corresponding to the period.

Moreover, the layer 1 processor 1081 receives acknowledgement information from the MAC processor 1082 when acknowledgement information is transmitted in the sub-frame in question, and receives user data from the MAC processor 1082 when the user data are transmitted in the sub-frame in question.

The MAC processor 1082 determines the transmit format of uplink user data and performs a transmission process such as retransmission control in the MAC layer based on the decoding result of Uplink Scheduling Grant included in the physical downlink control channel received from layer 1 processor 1081. In other words, when it is allowed to conduct communications using a shared channel in uplink, in the physical downlink control channel received from the layer 1 processor 1081, a transmit process such as retransmission control or determining of transmission format is performed on user data to be transmitted so as to provide the user data to the layer 1 processor 1081. Here, the uplink scheduling grant may include information on the transmit power of the uplink shared channel. In this case, information on the transmit power of the uplink shared channel is also provided to the layer 1 processor 1081. Moreover, the MAC processor 1082 reports, to the maximum transmit power controller 1083, information on the amount of frequency resources when conducting transmission in the sub-frame, modulation scheme, and the position in the frequency resources that are included in the uplink scheduling grant.

Furthermore, the MAC processor 1082 performs a receive process such as MAC retransmission control of downlink user data based on decoding results of the physical downlink control channel received from the layer 1 processor 1081. In other words, when it is reported that communications using a shared channel in downlink is conducted, the received user data are decoded and CRC checked for whether the user data signal is erroneous. Then, the acknowledgment information is generated based on the CRC check result and reported to the layer 1 processor 1081. If the CRC check result is OK, an acknowledgement signal ACK is generated as acknowledgement information, whereas if the CRC check result is NG, a negative acknowledgement signal NACK is generated as acknowledgement information.

Here, the uplink scheduling grant may include information on the transmit power of the uplink control channel. In this case, information on the transmit power of the uplink control channel is also provided to the layer 1 processor 1081.

Moreover, when parameters for controlling the transmit power of the uplink shared channel and control channel, and reference signal for sounding is mapped to broadcast information, etc., the broadcast information may be received to obtain the parameter, which is provided to the layer 1 processor.

The maximum transmit power controller 1083 receives, from the layer 1 processor 1081, information on the maximum transmit power of the mobile station in the cell in question, information that the maximum transmit power of the mobile station is set to be lower in the cell in question, or information indicating the geographical area in which the cell 50 is located; information on an operator providing communications using a mobile communications system in the cell 50, e.g., operator identifying information, information on whether the predetermined spurious emission requirement should be met, information on whether the predetermined ACLR requirement should be met, or information on whether the predetermined SEM requirement should be met that is included in broadcast information.

The maximum transmit power controller 1083 receives from the MAC processor 1082 information on the amount of frequency resources, modulation scheme, and the position of frequency resources when conducting uplink transmission in the sub-frame.

The maximum transmit power controller 1083 determines the maximum transmit power based on information on the maximum transmit power when information on the maximum transmit power of the mobile station in the cell in question is received.

For example, as a part of the above-described information on the maximum transmit power, when the nominal power, or in other words, the maximum transmit power in the specification, of the mobile station is 24 dBm, the maximum transmit power of the mobile station may be set to 23 dBm in the cell 50 when information that it is to be set 1 dB smaller is received. In this case, the mobile station 100n conducts uplink transmission with maximum transmit power set to 23 dBm. Here, the uplink transmission refers to transmission of uplink shared channel, or physical uplink shared channel (PUSCH), and transmission of uplink control channel, and a reference signal for the uplink. In the above-described example, values of 24 dBm and 23 dBm are merely exemplary so that other values may be used. For example, the maximum transmit power of the mobile station in the specification may be 23 dBm or 22 dBm.

Moreover, when amount of frequency resource used in transmitting an uplink shared channel, control channel, or reference signal is received as information on the maximum transmit power, or more specifically, information on the maximum transmit power that is set based on at least one of the number of resource blocks, size of resource units, and modulation scheme used in transmitting uplink shared channel or control channel is received, the maximum transmit power may be determined based on information on the above transmit power. For example, when the maximum transmit power or an amount of reduction from nominal power that is associated with an amount of frequency resource and modulation scheme as shown in FIG. 6 is received, the maximum transmit power is determined based on the amount of frequency resources and modulation scheme when conducting transmission in the sub-frame together with the table shown in FIG. 6. For the uplink shared channel, the modulation scheme and amount of frequency resources when conducting uplink transmission in the cell are included in information within the uplink scheduling grant mapped to the physical downlink control channel and received from the MAC processor 1082. In this case, the mobile station 100n conducts uplink transmission based on the maximum transmit power, which is received from the broadcast channel and is associated with a modulation scheme and frequency resources used in uplink transmission. For example, when information on the maximum transmit power that corresponds to the table shown in FIG. 6 is received, for the modulation scheme of 16QAM and the amount of frequency resources of 1800 kHz, the maximum transmit power controller 1083 sets the maximum transmit power to be 22.5 dBm.

In the table in FIG. 6, as information on the maximum transmit power that is included in the broadcast information, the amount of frequency resources and modulation scheme are predefined at both the base station apparatus 200 and mobile station 100n, so that the portion related to only the maximum transmit power or the amount of reduction from the nominal power may be received. In this case, the number of bits for information on the maximum transmit power in broadcast information may be reduced.

Alternatively, the table shown in FIG. 6 may be pre-defined in multiple at the base station apparatus 200 and the mobile station 100n, so that only identifying information (an information bit for identification) identifying the multiple number of tables may be received. In this case, the maximum transmit power controller 1083 may determine the maximum transmit power based on multiple tables (for example, one shown in FIG. 6) held in advance at the maximum transmit power controller 1083 and identifying information identifying the received table. For example as in FIG. 7, a case is shown such that two tables showing the correspondence among the amount of frequency resources used in transmitting uplink shared channels or control channels, modulation scheme, and maximum transmit power or amount of reduction from the nominal power are defined. Comparing Tables A and B, the maximum transmit power is set smaller in Table B. Or the amount of reduction from the nominal power is set larger in Table B. When Table B is reported as a part of broadcast information, the maximum transmit power controller 1083 determines the maximum transmit power based on the modulation scheme and amount of frequency resources when conducting uplink transmission in the sub-frame as well as Table B in the above. In this case, the mobile station 100n conducts uplink shared channel and control channel transmission based on the maximum transmit power which is specified in the broadcast channel and associated with modulation scheme and frequency resources used in uplink transmission.

In the above-described example, in a case shown such that identifying information identifying a table is transmitted as a part of broadcast information, a bit indicating application/non-application of the respective tables may be transmitted instead. In other words, with a bit indicating application and non-application of Tables A and B in FIG. 7 being defined, the mobile station 100n receives the bit per Table as a part of the broadcast information.

For example, when a bit indicating application is received for both Tables A and B in FIG. 7, the maximum transmit power controller 1083 may determine the maximum transmit power based on Tables A and B. More specifically, the maximum transmit power may be determined as the amount of reduction from the nominal power, which is the larger of the amount of reduction in Table A and amount of reduction in Table B. Alternatively, the maximum transmit power may be determined as the amount of reduction from the nominal power, which is the smaller of the amount of reduction in Table A and amount of reduction in Table B. Alternatively, the maximum transmit power may be determined as the amount of reduction from the nominal power, which is the average value of the amount of reduction in Table A and amount of reduction in Table B. The maximum transmit power may be determined as the amount of reduction from the nominal power, which is the sum of the amount of reduction in Table A and amount of reduction in Table B.

In the above-described example, while a case is described such that there are two tables of the Tables A and B, the number of tables may be other than two, such as one or three.

In the above-described example, while the maximum transmit power or the amount of reduction from the nominal power is associated with the amount of frequency resource or the modulation scheme, the maximum transmit power or the amount of reduction from the nominal power may further be associated with the system bandwidth in the system in question.

Alternatively, for example, when information on the maximum transmit power that is set based on at least one of the amount of frequency resources, more specifically the number of resource units or size of resource units, modulation scheme, and the position (e.g., center frequency) of the frequency band, used in transmitting uplink shared channel, control channel, or reference signal, is received, the maximum transmit power may be determined based on information on the above maximum transmit power. For example, when the maximum transmit power or an amount of reduction from nominal power that is associated with the amount of frequency resources, modulation scheme, and center frequency of the frequency band as shown in FIG. 8A is received, the maximum transmit power is determined based on the amount of frequency resources, modulation scheme, center frequency of the frequency band when conducting transmission in the sub-frame, and the table shown in FIG. 8A. For the uplink shared channel, information on the modulation scheme, amount of frequency resources, and the position in the frequency resource when conducting uplink transmission in the sub-frame are included in information within the uplink scheduling grant mapped to the physical downlink control channel, and are received from the MAC processor 1082. In this case, the mobile station 100n conducts uplink shared channel and control channel transmission based on the maximum transmit power, which is specified in the broadcast channel and is associated with the modulation scheme, frequency resources used in uplink transmission, and center frequency of the frequency band used in transmission.

Alternatively, what has been described as the center frequency of the frequency band used in the uplink transmission may be the frequency band in which the uplink transmission is conducted. Here, frequency bands (I, II, III, IV, . . . ) in 3GPP are defined in Non-patent document 4 (TS 25.101, 5.2), for example. Alternatively, what has been described as the central frequency of the frequency band used in the uplink transmission may be reported as a value such as 2 GHz band, 1.5 GHz band, or 800 MHz band.

Also in this case, as shown in FIG. 7, the table illustrated in FIG. 8A may be defined in multiple at the base station apparatus 200 and the mobile station 100n, so that only information identifying the multiple number of tables may be transmitted as broadcast information.

Also in this case, as described above, the base station 200 may transmit, as a part of broadcast information, a bit indicating application/non-application of the respective tables in lieu of identifying information in the table.

For example, a table shown in FIG. 8B may be used in lieu of a table shown in FIG. 8A. In FIG. 8B, the one line specified with a network signaling value corresponds to Table A or Table B in FIG. 8A or FIG. 7. In other words, network signaling value (NS_01, NS_02, . . . ) at the left-most column in FIG. 8B corresponds to information identifying the multiple tables as described above.

Moreover, a requirement (sub-clause) (6.6.2.4.1, 6.6.2.2.1, . . . ) at the second left column in FIG. 8B corresponds to below-described information on whether a predetermined spurious emission requirement should be met, information on whether an ACLR requirement should be met, or information on whether a spectrum emission mask requirement should be met. More specifically, "6.6.3.3.1" for NS_05 in FIG. 8B may correspond to information on whether the predetermined spurious emission requirement should be met, "6.6.2.4.1" for NS_02 in FIG. 8B may correspond to information on whether a predetermined ACLR requirement should be met, and "6.6.2.2.1" for NS_03 in FIG. 8B may correspond to information on whether a predetermined SEM requirement should be met. In other words, the predetermined spurious emission requirement to be met may be defined in sub-clause "6.6.3.3.1" for NS_05 in FIG. 8B, the predetermined ACLR requirement to be met may be defined in sub-clause "6.6.2.4.1" for NS_02 in FIG. 8B, and the predetermined SEM requirement to be met may be defined in sub-clause "6.6.2.2.1" for NS_03 in FIG. 8B.

Moreover, E-UTRA band (1, 6, 9, 10, 11) in the third left column in FIG. 8B corresponds to the position in the frequency band used in transmitting as described above. In other words, E-UTRA band (1, 6, 9, 10, 11) in the third left column in FIG. 8B corresponds to the center frequency in the frequency band in FIG. 8A.

Furthermore, channel bandwidth (MHz) (10, 3, 5, . . . ) in the fourth left column in FIG. 8B corresponds to the system bandwidth in the system in question.

Moreover, the fifth left element of "resource blocks" (>[30], >[5], . . . ) in FIG. 8B corresponds to the above-described amount of frequency resources. In other words, the fifth left element of "Resource Blocks" (>[30], >[5], . . . ) in FIG. 8B corresponds to the amount of frequency resources (the number of resource blocks) in the left-most column in FIG. 8A.

Furthermore, the sixth left A-MPR in FIG. 8B corresponds to the above-described amount of reduction from the nominal power. In other words, the sixth left A-MPR in FIG. 8B corresponds to the amount of reduction from the nominal power in the right-most column in FIG. 8A. The A-MPR in FIG. 8B, which may be called Additional Maximum Power Reduction, is an amount by which the maximum transmit power may be reduced rather than an amount by which the maximum transmit power must be reduced.

Alternatively, the maximum transmit power controller 1083 may receive, for example, information on the calculation equation of a Cubic metric as information on the maximum transmit power, and determine the maximum transmit power based on information on the calculation equation of the Cubic metric. Here, with the Cubic metric equation of, for example:

$$CM = a + [20*\log_{10}((v\_norm\ 3)rms) - 20*\log_{10}((v\_norm\_ref\ 3)rms)]/k,$$

where v_norm is a normalized voltage waveform of a signal,
v_norm_ref is a reference for the normalized voltage waveform of the signal, and
the amount of reduction from the nominal power=CM+b. (In this case, the maximum transmit power=nominal power−amount of reduction from the nominal power.)
The value of a, b, or k may be set to be information on the Cubic metric calculation equation. In other words, the mobile station 100n may receive, as broadcast information, information on the Cubic metric calculation equation (e.g., values of a, k, b), calculate the Cubic metric based on the values of a, k, b specified in the broadcast information, and determine the amount of reduction from the nominal power, in other words, the maximum transmit power, from the Cubic metric. The Cubic metric equation is merely exemplary so that other equations are also applicable. Moreover, what is described as Cubic metric may be another metric as long as the latter is a metric from which power leaking into the adjacent channel may be estimated.

The above-described value of a, k, or b may be set according to the center frequency of the frequency band used in transmitting an uplink shared channel, control channel, or reference signal. For example, two sets of a, k, and b values, or in other words, the above-described values of a, k, and b for the center frequency of 1920 to 1930 MHz and the above-described values of a, k, and b for the center frequency of 1930 to 1940 MHz may be set as broadcast information.

Alternatively, the maximum transmit power controller 1083 may receive, as a part of broadcast information, information indicating the geographical area in which the cell 50 is located, and information on an operator which provides communications using a mobile communications system in the cell 50 (e.g., information identifying the operator). Here, the information indicating the geographical area includes a country code, for example. Moreover, the operator information includes PLMN-identity, for example. In this case, the maximum transmit power controller 1083 may hold in advance information on the operator, which provides a table illustrated in FIG. 6 or 7 or 8A or 8B that is associated with information on the operator, which provides communications using mobile communications in the cell 50 (e.g., operator identifying information) and information indicating the geographical area in which the cell 50 is located, and determine the maximum transmit power based on the table illustrated in FIG. 6 or 7 or 8A or 8B, the operator information, and the information showing the geographical area. For example, assume that the maximum transmit power controller 1083 holds Table A in FIG. 7 for the geographical area A, and Table B in FIG. 7 for the geographical area B. In this case, when the geographical area B is received, in the broadcast information, as information indicating the geographical area in which the cell 50 is located, the maximum transmit power is determined based on the Table B, the amount of frequency resources and the modulation scheme used in uplink transmitting in the sub-frame. In other words, the mobile station 100n conducts uplink transmission with the maximum transmit power, as an upper limit maximum transmit power, that is determined based on information indicating the geographical area or information indicating the operator that is received in the broadcast information, a table associating the amount of frequency resources, modulation scheme, and maximum transmit power that is held in advance, the amount of frequency resource, and modulation scheme used in uplink transmitting in the sub-frame.

Alternatively, the maximum transmit power controller 1083 may receive, as a part of broadcast information, information on whether the mobile station 100n should meet the predetermined spurious emission requirement. In this case, when the maximum transmit-power controller 1083 receives information that the requirement on the spurious emission to the PHS band should be met, for example, it conducts uplink transmission such that the requirement on the spurious emission to the PHS band is always met. Here, the information that the requirement on the spurious emission to the PHS band should be met may mean that the requirement on the spurious emission to the PHS band should be met even where the ACLR requirement is applied and the requirement on the spurious emission is not applied, for example. Moreover, in order to meet the requirement on the spurious emission to the PHS band, the maximum transmit power controller 1083 may hold a table shown in FIG. 6, 7, 8A or 8B, and determine the maximum transmit power based on the table as described above. In this case, the table shown in FIG. 6 or 7 or 8A or 8B is set such as to be able to meet the spurious emission requirement for the PHS band. In other words, the mobile station 100n conducts uplink transmission with the maximum transmit power, as an upper limit maximum transmit power, that is determined based on information on whether the mobile station 100n should meet the predetermined requirement on spurious emission, a table associating the amount of frequency resources, modulation scheme, and maximum transmit power that is held in advance, the amount of frequency resources, and modulation scheme used in uplink transmitting in the sub-frame.

Alternatively, the maximum transmit power controller 1083 may receive, as a part of broadcast information, information on whether the mobile station 100n should meet the predetermined ACLR requirement. In this case, when the maximum transmit power controller 1083 receives information that a specified value of 43 dB should be met as the ACLR2 requirement for W-CDMA systems, for example, the maximum transmit power controller 1083 conducts uplink transmission such that the ACLR2 requirement for W-CDMA systems of 43 dB is always met. Moreover, when the maximum transmit power controller 1083 receives information that a specified value of 38 dB should be met as an ACLR2 requirement for W-CDMA systems, for example, the maximum transmit power controller 1083 conducts uplink transmission such that the ACLR2 requirement for the W-CDMA systems of 38 dB is always met. Moreover, in order to meet the ACLR2 requirement of 43 dB or of 38 dB, for example, the maximum transmit power controller 1083 may hold a corresponding table shown in FIG. 6, 7, 8A or 8B, and determine the maximum transmit power based on the table as described above. In this case, for the table shown in FIG. 6, 7, 8A or 8B, what meets the ALR2 requirement of 43 dB and what meets the requirement of 38 dB are both set. More specifically, when broadcast information specifying that the ACLR2 requirement of 38 dB is to be met is received, the maximum transmit power may be determined based on Table A in FIG. 7, whereas when broadcast information specifying that the ACLR2 requirement of 43 dB is to be met is received, the maximum transmit power may be determined based on Table B in FIG. 7. In other words, the mobile station 100*n* conducts uplink transmission with the maximum transmit power, as an upper limit maximum transmit power, that is determined based on information on whether the mobile station 100*n* should meet the predetermined ACLR requirement, a table associating the amount of frequency resources, modulation scheme, and maximum transmit power that is held in advance, the amount of frequency resources, and modulation scheme used in uplink transmitting in the sub-frame. In this way, multiple tables for reducing the maximum transmit power are held for multiple ACLR requirements so as to make it possible to flexibly reduce the maximum transmit power.

In the above-described example, while the broadcast information generator 2084 generates, as a part of broadcast information, information on whether the predetermined spurious emission requirement should be met, or information on whether the ACLR requirement should be met, it may instead generate, as a part of broadcast information, information on whether the predetermined spectrum emission mask requirement (SEM requirement) should be met, and report the broadcast information to the mobile station.

The maximum transmit power controller 1083 reports the above-described maximum transmit power determined to the layer 1 processor 1081.

Figure 11:
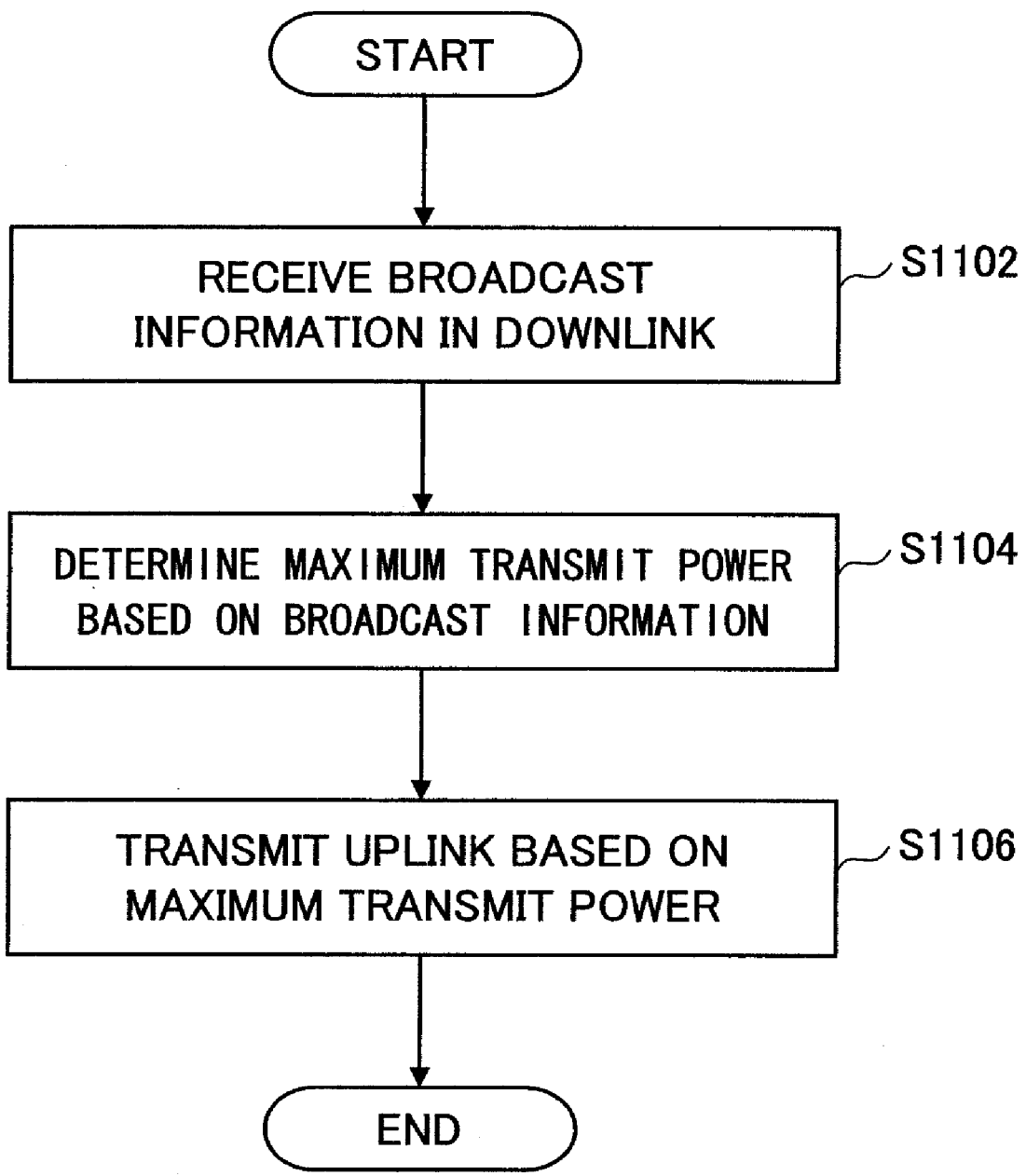
FIG. 11 is a flowchart illustrating a communications control method in the mobile station according to an embodiment of the present invention.

FIG. 11 illustrates a method of communications control in the mobile station 100*n* according to an embodiment of the present invention.

In step S1102, the mobile station 100*n* receives broadcast information in downlink. As shown in below-described embodiment 1 or 2 of the present invention, a NAS message (Non Access Stratum message) or RRC message, instead of broadcast information, may be received.

Next, in step S1104, the mobile station 100*n* determines the maximum transmit power based on information on maximum transmit power included in the above broadcast information, NAS message, or RRC message. Here, the mobile station 100*n* may determine the maximum transmit power based on the amount of frequency resources, modulation scheme, the position in the frequency band when conducting transmission in the sub-frame in question, and Table on FIG. 6, 7 or 8A. Alternatively, the mobile station 100*n* may determine the maximum transmit power based on the amount of frequency resources, modulation scheme, the position of the frequency resource, the frequency band, system bandwidth when conducting transmission in the sub-frame in question, and FIG. 8B.

Then, in step S1106, uplink transmission is conducted based on the maximum transmit power determined in step S1104. More specifically, the transmit power of the uplink shared channel or control channel is controlled such that it becomes no more than the Maximum Transmit power. When the transmit power of the uplink shared channel and control channel exceeds the maximum transmit power, it is set to the maximum transmit power and the mobile station 100*n* conducts uplink transmission using the transmit power.

According to the embodiment of the present invention, determining the uplink maximum transmit power based on information on the maximum transmit power that is reported in broadcast information makes it possible to properly reduce the amount of interference on the adjacent system depending on the geographical area in which the mobile communications system is applied and other situations and provide efficient services using mobile communications.

Embodiment 2

In the present embodiment, configurations of the above-described mobile station 100, mobile station 100*n* and base station apparatus 200 are the same as the above-described embodiment, so that duplicate description will be omitted.

The difference mainly includes an access gateway apparatus 300, a maximum transmit power controller 1083 and a layer 1 processor 1081 in the mobile station 100*n*.

The access gateway apparatus 300 transmits a NAS message to the mobile station 100*n* which is performing location registration. The NAS message is transmitted via the base station apparatus 200 to the mobile station 100*n*. The NAS message includes operator information, country code, and public land mobile network identity (PLMN).

The base station 200 apparatus receives the NAS message from the access gateway apparatus 300 and transmits the message to the mobile station 100*n* performing location registration.

The mobile station 100*n* performs location registration when it crosses a location registration area, moves to a different network area, or is powered on, and receives the NAS message. The operation of the mobile station 100*n* when the NAS message is received will be described.

The NAS message is reported to the maximum transmit power controller 1083 via the transmit and receive antenna 102, amplifier 104, transmitter/receiver 106, and layer 1 processor 1081.

The maximum transmit power controller 1083 determines the maximum transmit power based on information on operator and country code, and PLMN identity that is included in the NAS message. For example, the maximum transmit power controller 1083 may hold in advance a table shown in FIG. 6, 7, 8A or 8B that is associated with the operator information, country information, PLMN identity, etc., and determine the maximum transmit power based on the operator information, country code, and PLMN identity, etc., and a table shown in FIG. 6, 7, 8A or 8B. For example, assume that the maximum transmit power controller 1083 holds Table A in FIG. 7 for the country code A, and Table B in FIG. 7 for the country code B. In this case, when the country code A is received in the NAS message, the maximum transmit power is determined based on the amount of frequency resources and modulation scheme used in uplink transmission in the sub-frame in question. In other words, the mobile station 100*n* conducts uplink transmission with the maximum transmit power, as an upper limit maximum transmit power, that is determined based on operator information, country code, PLMN identity, etc., that are received in the NAS message, a table associating the amount of frequency resources, modulation scheme, and maximum transmit power that is held in advance, the amount of frequency resources and modulation scheme used in uplink transmitting in the sub-frame. When determining the maximum transmit power based on the table shown in FIG. 8B, the maximum transmit power may be determined based on the amount of frequency resources when conducting transmission in the sub-frame, modulation scheme, position of the frequency resources, the frequency band, system bandwidth, and FIG. 8B.

In the above-described example, the maximum transmit power is determined based on the operator information, country code, and PLMN identity that are received in the NAS message, the amount of frequency resources and modulation scheme used in uplink transmission in the sub-frame; the maximum transmit power may further be determined based on the position of frequency resources used in uplink transmission in the sub-frame (e.g., center frequency of the frequency resources).

Moreover, while the maximum transmit power is determined based on the operator information, country code, PLMN identity, etc., that are received in the NAS message in the above-described example, bits for determining the maximum transmit power may be newly added and the bits may be used to perform the control instead. In this case, the Tables shown in FIG. 6 or 8A are pre-defined in multiple in both the base station apparatus 200 and the mobile station 100n, so that the bits and the multiple Tables are collated one to one. Alternatively, the Table shown in FIG. 8A is pre-defined in multiple in both the base station apparatus 200 and the mobile station 100n, so that the bits and the multiple Tables are collated one to one. Then, according to the value of the specified bit, the mobile station 100n selects a Table or line to be used from the multiple Tables, and determines the maximum transmit power based on the Table or line. Here, as shown in FIG. 6 or 8A or 8B, the maximum transmit power of the mobile station may be determined based on at least one of the amount of frequency resources, modulation scheme, and the position of frequency resources used in uplink transmission in the sub-frame. When determining the maximum transmit power based on the table shown in FIG. 8B, the maximum transmit power may be determined based on the amount of frequency resources when conducting transmission in the sub-frame, modulation scheme, position of the frequency resource, the frequency band, system bandwidth, and FIG. 8B.

Here, as shown in the embodiment 1, the bit may be identifying information for identifying the table, or it may be a bit indicating application/non-application for each table.

Embodiment 3

In the present embodiment, configurations of the above-described mobile communications system 1000, mobile station 100n and base station apparatus 200 are the same as the above-described embodiment, so that duplicate descriptions will be omitted.

The difference mainly includes a call processor 210, a maximum transmit power controller 1083, and a layer 1 processor 1081 in the mobile station 100n.

The call processor 210 transmits an RRC (Radio Resource Control) message to the mobile station 100n, which is starting communications. The RRC message is transmitted to the mobile station 100n via the RLC processor 2083, the MAC processor 2082, the layer 1 processor 2081, the transmitter and receiver 206, the amplifier 204, and the transmit and receive antenna 202. The RRC message includes operator information, country code, PLMN identity, etc.

For example, the mobile station 100n receives the RRC message when starting communications.

More specifically, the mobile station 100n, for example, receives the RRC message as described above as a return for an RRC message transmitted to the base station apparatus 200 for an outgoing or incoming call. For example, an RRC message which specifies a connection establishment that is a return for an RRC message requesting a connection corresponds to the RRC message as described above.

The above-described "starting communications" may include the following cases. For example, as an event of "starting communications", the mobile station 100n may include an event of "connection re-establishment". In other words, the mobile station 100n receives the RRC message as described above as a return for an RRC message transmitted to the base station apparatus 200 for making a connection re-establishment. For example, cell update confirm, which is a return for cell update, which makes a connection re-establishment, corresponds to the RRC message. Alternatively, as an event of "starting communications", the mobile station 100n may include an event of "conducting a handover". In this case, starting communications with the target base station corresponds to starting communications. In other words, the mobile station 100n receives the RRC message as a signal indicating a handover from the base station apparatus 200. The signal specifying the handover may be transmitted from the source base station or target base station. Moreover, the handover as described above may be a handover between sectors in the base station apparatus in the same frequency. Alternatively, the handover as described above may be a handover between different frequencies, or a handover between different systems. The handover between different systems may be a handover from GSM to Evolved UTRA and UTRAN, or a handover from W-CDMA or UTRA and UTRAN to Evolved UTRA and UTRAN, for example. Alternatively, the handover may be relocation at the handover in which the mobile station 100n crosses different MMES and different location registration areas.

Alternatively, the timing in which the RRC message is transmitted may not only be for starting communications, but also for re-configuring the communications setup. Here, re-configuring the communications setup corresponds, for instance, to re-configuring the physical channel, transport channel, or radio bearer.

Alternatively, the timing at which the RRC message is transmitted may be not only when starting communications, but also when the radio bearer is released or set up.

The operation of the mobile station 100n for receiving the RRC message is shown below.

The RRC message is reported to the maximum transmit power controller 1083 via the transmit and receive antenna 102, the amplifier 104, the transmitter/receiver 106, and the layer 1 processor 1081.

The maximum transmit power controller 1083 determines the maximum transmit power based on information on an operator and country code, and PLMN identity that are included in the RRC message. For example, the maximum transmit power controller 1083 may hold in advance a table shown in FIG. 6, 7, 8A or 8B that is associated with the operator information, country information, PLMN identity, etc., and determine the maximum transmit power based on the operator information, country code, PLMN identity, etc., and a table shown in FIG. 6, 7, 8A or 8B. For example, assume that the maximum transmit power controller 1083 holds Table A in FIG. 7 for the country code A, and Table B in FIG. 7 for the country code B. In this case, when the country code A is received in the RRC message, the maximum transmit power is determined based on Table A, the amount of frequency resources and modulation scheme used in uplink transmission in the sub-frame in question. In other words, the mobile station 100n conducts uplink transmission with the maximum transmit power, as an upper limit maximum transmit power, that is determined based on operator information, country code, PLMN identity, etc., that are received in the RRC message, a table associating the amount of frequency resources, modulation scheme, and maximum transmit power that is held in advance, the amount of frequency resources and modulation scheme used in uplink transmitting in the sub-frame. When determining the maximum transmit power based on the table shown in FIG. 8B, the maximum transmit power may be determined based on the amount of frequency resources, modulation scheme, position of the frequency resources, the frequency band, system bandwidth when conducting transmission in the sub-frame, and FIG. 8B.

In the above-described example, while the maximum transmit power is determined based on the operator information, country code, and PLMN identity that are received in the RRC message, the amount of frequency resources and modulation scheme used in uplink transmission in the sub-frame, the maximum transmit power may further be determined based on the position of frequency resources used in uplink transmission in the sub-frame (e.g., center frequency of the frequency band).

Moreover, while the maximum transmit power is determined based on the operator information, country code, PLMN identity, etc., that are included in the RRC message in the above-described example, a bit for determining the maximum transmit power may be newly added and the bit may be used to perform the control instead. In this case, the Tables shown in FIG. 6 or 8A are pre-defined in multiple in both the base station apparatus 200 and the mobile station 100n, for example, so that the bits and the multiple Tables are collated one to one. Alternatively, the Table shown in FIG. 8B is pre-defined in multiple in both the base station apparatus 200 and the mobile station 100n, for example, so that the bits and the respective lines in multiple Tables are collated one to one. Then, according to the value of the specified bit, the mobile station 100n selects a Table or line to be used from the multiple Tables, and determines the maximum transmit power based on the Table or line. Here, as shown in FIG. 6 or 8A or 8B, the maximum transmit power of the mobile station may be determined based on at least one of the amount of frequency resources, modulation scheme, and the position of frequency resources used in uplink transmission in the sub-frame. When determining the maximum transmit power based on the table shown in FIG. 8B, the maximum transmit power may be determined based on the amount of frequency resources, modulation scheme, position of the frequency resource, the frequency band, system bandwidth when conducting transmission in the sub-frame, and FIG. 8B.

For example, as bits for determining the maximum transmit power, additionalSpectrumEmission may be specified, the additionalSpectrumEmission may be included in the parameter list for controlling the Mobility that is called Mobility Control Information, which may be reported as the RRC message at the time of handover or at the time of starting communications. An example of information elements of Mobility Control Information is shown in FIGS. 8E and 8F. The explanation for additionalSpectrumEmission is the same for additionalSpectrumEmission in FIG. 8C, so that it will be omitted here.

The following describes the contents of the system information block shown in FIGS. 8E and 8F.

MobilityControlInformation, which is information on mobility control, includes "targetCellIdentity", which is an identifier of a target cell, "eutra-CarrierFreq", which is information on frequency, "eutra-CarrierBandwidth", which is information on system bandwidth, "additionalSpectrumEmission" which is spurious emission to be additionally applied, information on configuration of a semi-static common channel, and a parameter on dedicated random access. EUTRA-CarrierBandwitdh, which is information on system bandwidth, includes downlink bandwidth and uplink bandwidth.

Here, as shown in the embodiment 1, the bit may be a bit identifying information for identifying the table, or it may be a bit indicating application/non-application of each table.

Alternatively, the maximum allowed transmit (UL TX) power defined per bandwidth may be reported to a mobile station to perform similar control. In other words, information elements of the RRC message as shown in FIG. 12 are defined and reported to the mobile station. FIG. 12 envisages a case where the system bandwidth is 20 MHz. Then, the mobile station 100n conducts uplink transmission based on specified maximum allowed transmit power defined per bandwidth. In other words, uplink transmission is conducted such that the uplink transmit power does not exceed the maximum allowed transmit power defined per bandwidth.

For example, when the maximum allowed transmit power defined in the bandwidth that is specified by the base station apparatus 200 in the RRC message is an example in FIG. 12, assuming the uplink transmit bandwidth of 9360 kHz (the number of resource blocks of 52), the mobile station 100n conducts uplink transmission such that the uplink transmit power does not exceed 18 dBm.

While the above-described example shows a case of the system bandwidth of 20 MHz, the same control may be applied to cases other than 20 MHz. For example, when the system bandwidth is 10 MHz, out of the chart shown in FIG. 12, only the line of the maximum allowed transmit power (the number of resource blocks<=25) and the line of the maximum allowed transmit power (25<resource blocks<=50) may be reported to the mobile station.

While an example is described in a system in which Evolved UTRA and UTRAN (also known as Long Term Evolution, or Super 3G) is applied, the mobile station, base station apparatus, mobile communications system, and communications control method according to the present invention may also be applicable in other systems which conduct mobile communication.

In the above-described embodiments, the process of reducing the maximum transmit power according to the geographical area in which the mobile communications is applied and various situations to reduce the amount of interference on the adjacent system may be applied per mobile station or per cell. For example, for using the broadcast information, it may generally be applied per cell, while it may be applied per mobile station for using the RRC and NAS messages.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. Breakdown of the respective embodiments are not essential to the present invention, so that two or more embodiments may be used as needed. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2007-94902 filed on Mar. 30, 2007, the entire contents of which are hereby incorporated by reference.

The present international application claims priority based on Japanese Patent Application No. 2007-107603 filed on Apr. 16, 2007, the entire contents of which are hereby incorporated by reference.

The present international application claims priority based on Japanese Patent Application No. 2007-161944 filed on Jun. 19, 2007, the entire contents of which are hereby incorporated by reference.

The present international application claims priority based on Japanese Patent Application No. 2007-211595 filed on Aug. 14, 2007, the entire contents of which are hereby incorporated by reference.

The invention claimed is:

1. A user apparatus which wirelessly communicates with a base station apparatus within a mobile communications system, comprising:
- a receive unit which receives control information in downlink, the control information indicating a network signaling value, the network signaling value specified in multiple numbers, and a combination of requirements on adjacent-channel interference and a spurious emission, position of a frequency band, a channel bandwidth, the number of frequency resources, and a maximum power reduction amount being specified for each of the network signaling value;
- a maximum transmit power control unit which specifies a maximum transmit power reduction amount based on the network signaling value indicated in the control information received at the receive unit and modifies a maximum value of a transmit power with the maximum transmit power reduction amount; and
- a transmit unit which transmits a channel in uplink in accordance with the maximum value of the transmit power modified at the maximum transmit power control unit.

2. The user apparatus as claimed in claim 1, wherein the control information is transmitted using a broadcast channel, a radio resource control (RRC) message when starting communications, or a non access stratum (NAS) message when registering a position.

3. The user apparatus as claimed in claim 1, wherein the channel is at least one of an uplink shared channel, an uplink control channel and an uplink reference signal.

4. The user apparatus as claimed in claim 1, wherein the control information specifies whether the value of the maximum transmit power of the channel is made smaller.

5. The user apparatus as claimed in claim 4, wherein, when the control information specifies that the value of the maximum transmit power of the channel is made smaller,
- the transmit unit makes the value of the maximum transmit power of the channel smaller based on at least one of an amount of a frequency resource on the channel, a number of resource blocks, a modulation scheme, a frequency, and a cubic metric.

6. The user apparatus as claimed in claim 4, wherein, when the control information specifies that the value of the maximum transmit power of the channel is made smaller,
- the transmit unit makes the value of the maximum transmit power of the channel smaller such that an amount of interference to a predetermined frequency band becomes no larger than a predetermined threshold.

7. The user apparatus as claimed in claim 4, wherein, when the control information specifies that the value of the maximum transmit power of the channel is made smaller,
- the transmit unit makes the value of the maximum transmit power of the channel smaller such that it meets at least one of a spurious emission requirement, an adjacent channel leakage power ratio (ACLR) requirement, and a spectrum emission mask (SEM) requirement that are predetermined.

8. The user apparatus as claimed in claim 1, wherein the control information specifies one of information on a geographical area in which the mobile communications system is provided, a country code, information identifying an operator providing the mobile communications system, and a public land mobile network (PLMN) identifier, wherein
- the transmit unit makes the value of the maximum transmit power of the channel smaller based on at least one of the information on the geographical area in which the mobile communications system is provided, the country code, the information identifying the operator providing the mobile communications system, and the PLMN identifier.

9. The user apparatus as claimed in claim 8, wherein the transmit unit makes the value of the maximum transmit power of the channel smaller based on at least one of an amount of a frequency resource on the channel, a number of resource blocks, a modulation scheme, a frequency, and a cubic metric.

10. The user apparatus as claimed in claim 8, wherein the transmit unit reduces the maximum transmit power such that an amount of interference to a predetermined frequency band becomes no larger than a predetermined threshold.

11. The user apparatus as claimed in claim 5, wherein the transmit unit sets a transmit power of the channel to be no more than the value of the maximum transmit power of the channel.

12. The user apparatus as claimed in claim 1, wherein the value of the maximum transmit power of the channel is set differently for each of multiple bandwidths.

13. A base station apparatus which wirelessly communicates with a user apparatus within a mobile communications system, comprising:
- a transmit unit which transmits control information in downlink, the control information indicating a network signaling value, the network signaling value specified in multiple numbers, and a combination of requirements on adjacent-channel interference and a spurious emission, position of a frequency band, a channel bandwidth, a number of frequency resources, and a maximum power reduction amount being specified for each of the network signaling value;
- a broadcast information generator unit which generates the control information on a maximum transmit power of the user apparatus, wherein the maximum transmit power is set to be smaller than a nominal power based on the network signaling value indicated in the control information transmitted at the transmit unit; and
- a receive unit which receives a channel in uplink in accordance with the maximum value of the transmit power modified at the user apparatus based on the information provided by the broadcast information generator unit.

14. The base station apparatus as claimed in claim 13, wherein the transmit unit transmits the control information using a broadcast channel, an RRC message when starting communications, or an NAS message when registering a location.

15. The base station apparatus as claimed in claim 13, wherein the first channel is at least one of an uplink shared channel and an uplink control channel.

16. The base station apparatus as claimed in claim 13, wherein the control information specifies a leakage power into a predetermined frequency band such that it becomes no greater than a predetermined threshold.

17. The base station apparatus as claimed in claim 13, wherein the control information specifies that it meets at least one of a spurious emission requirement, an ACLR requirement, and an SEM requirement that are predetermined.

18. The base station apparatus as claimed in claim 13, wherein the value of the maximum transmit power of the first channel is set differently for each of multiple bandwidths.

19. A method of controlling in a user apparatus which wirelessly communicates with a base station apparatus within a mobile communications system, comprising:
- a first step of receiving control information in downlink, the control information indicating a network signaling value, the network signaling value specified in multiple numbers, and a combination of requirements on adjacent-channel interference and a spurious emission, position of a frequency band, a channel bandwidth, a number of frequency resources, and a maximum power reduction amount being specified for each of the network signaling value,
    wherein a maximum transmit power control unit specifies the maximum transmit power reduction amount based on the network signaling value indicated in the control information received at the receive unit and modifies a maximum value of a transmit power with the maximum transmit power reduction amount;
- a second step of making a maximum of a transmit power in uplink to be less than a nominal power specified for the mobile communications system based on the control information; and
- a third step of transmitting a first channel in uplink in accordance with the maximum value of the transmit power modified at the maximum transmit power control unit.

* * * * *